(12) United States Patent
Berdoulat

(10) Patent No.: US 10,502,755 B2
(45) Date of Patent: Dec. 10, 2019

(54) METHOD FOR CORRECTING THE CALCULATION OF A FLIGHT CHARACTERISTIC OF AN AEROPLANE BY TAKING VERTICAL WIND INTO ACCOUNT, METHOD FOR CALCULATING THE DRAG COEFFICIENT

(71) Applicant: Laurent Berdoulat, Gagnac-sur-Garonne (FR)

(72) Inventor: Laurent Berdoulat, Gagnac-sur-Garonne (FR)

( * ) Notice: Subject to any disclaimer, the term of this patent is extended or adjusted under 35 U.S.C. 154(b) by 202 days.

(21) Appl. No.: 15/543,829

(22) PCT Filed: Jan. 15, 2016

(86) PCT No.: PCT/FR2016/050072
§ 371 (c)(1),
(2) Date: Jul. 14, 2017

(87) PCT Pub. No.: WO2016/113511
PCT Pub. Date: Jul. 21, 2016

(65) Prior Publication Data
US 2017/0356925 A1    Dec. 14, 2017

(30) Foreign Application Priority Data
Jan. 15, 2015    (FR) ...................... 15 50308

(51) Int. Cl.
*G01P 13/02*    (2006.01)
*B64D 43/00*    (2006.01)

(52) U.S. Cl.
CPC ............ *G01P 13/025* (2013.01); *B64D 43/00* (2013.01)

(58) Field of Classification Search
CPC ........ G01P 13/025; B64D 43/00; B64D 43/02
See application file for complete search history.

(56) References Cited

U.S. PATENT DOCUMENTS

| 2011/0071710 A1 | 3/2011 | Puig et al. |
| 2013/0035808 A1* | 2/2013 | Golling ..................... B64C 9/16 |
| | | 701/3 |

OTHER PUBLICATIONS

E Zeis Joseph: "angle of attack and sideslip estimation using an inertial reference frame", Jun. 23, 1988 (Jun. 23, 1988), Ohio, USA, XP055206887, Retrieved from the Internet <URL:http://www.dtic.mil/dtic/tr/fulltext/u2/a194876.pdf> [retrieved on Aug. 7, 2015].

(Continued)

*Primary Examiner* — Anne M Antonucci
*Assistant Examiner* — Renee LaRose
(74) *Attorney, Agent, or Firm* — Young & Thompson

(57) ABSTRACT

Disclosed is a method of correcting at least one result of calculating at least one flight characteristic of an airplane, based on in-flight measurements and on values calculated from the measurements, the in-flight measurements being taken in at least one determined flight condition defining a determined flight point, each flight condition being defined by particular flight parameter values, the measurements and values being in particular: $\theta_{measure}$ the measured pitch angle of the airplane and $\alpha_{model}$ the angle of attack calculated by solving a lift equation and an aerodynamic model associating the angle of attack $\alpha$ of the airplane with at least one flight parameter, which is the lift coefficient Cz of the airplane. The pitch angle measurements $\theta_{measure}$ are corrected by a pitch angle correction term $\Delta\theta_0$ that is a particular constant for each flight, and the calculated angles of attack $\alpha_{model}$ are corrected by an angle of attack correction term $\Delta\alpha(Cz \ldots)$.

19 Claims, 8 Drawing Sheets

Angles and speeds

(56) References Cited

OTHER PUBLICATIONS

W. Bogel et al: "Test and calibration of the DLR Falcon Wind measuring system by maneuvers", Journal of Atmopheric and Oceanic Technology, vol. 8, No. 1, Feb. 28, 1991 (Feb. 28, 1991), pp. 5-18, XP055207092.
International Search Report, dated Apr. 25, 2016, from corresponding PCT/FR2016/050072 application.

* cited by examiner

Angles and speeds

Forces

Figure 3 – PRIOR ART

Before correction                    FIGURE 6
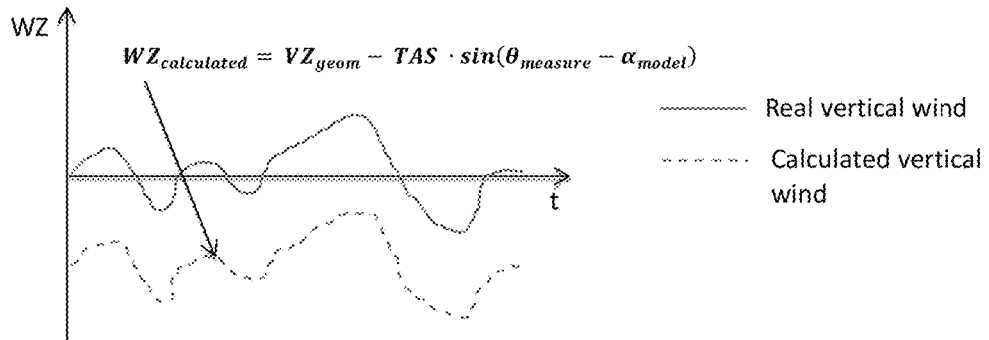
Variables:
$\Delta\theta_0(flight_1)$
$\Delta\alpha(Mach = 0.8, Cz = 0.5)$
Constraints:
$\langle WZ_{calculated}(flight_1)\rangle = 0$
$\Delta\alpha(Mach = 0.8, Cz = 0.5) = 0$
After correction
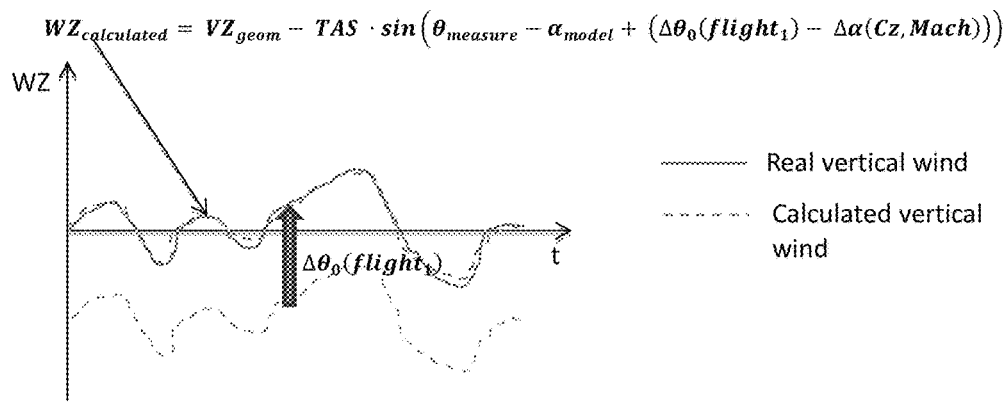

Before correction                    FIGURE 7
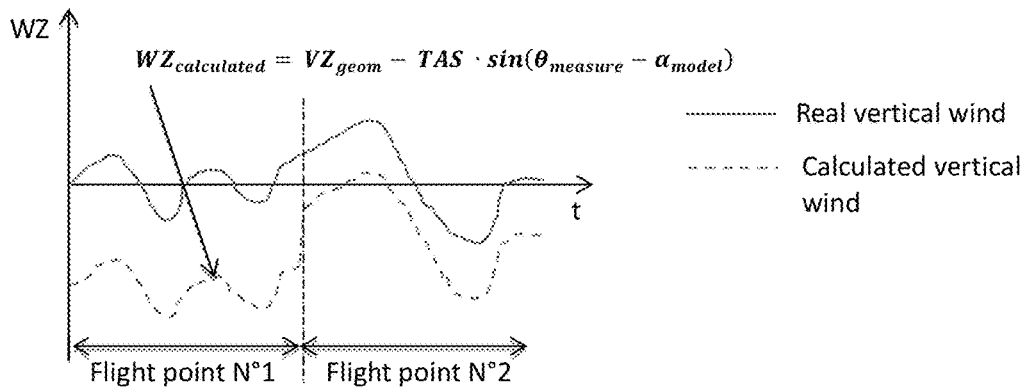
Variables:
$\Delta\theta_0(flight_1)$
$\Delta\alpha_1(Mach = 0.8, Cz = 0.5)$
$\Delta\alpha_2(Mach = 0.8, Cz = 0.6)$
Constraints:
$\langle WZ_{calculated}(flight_1)\rangle = 0$
$\langle WZ_{calculated}(Mach = 0.8, Cz = 0.5)\rangle = 0$
$\Delta\alpha_1 + \Delta\alpha_2 = 0$
After correction
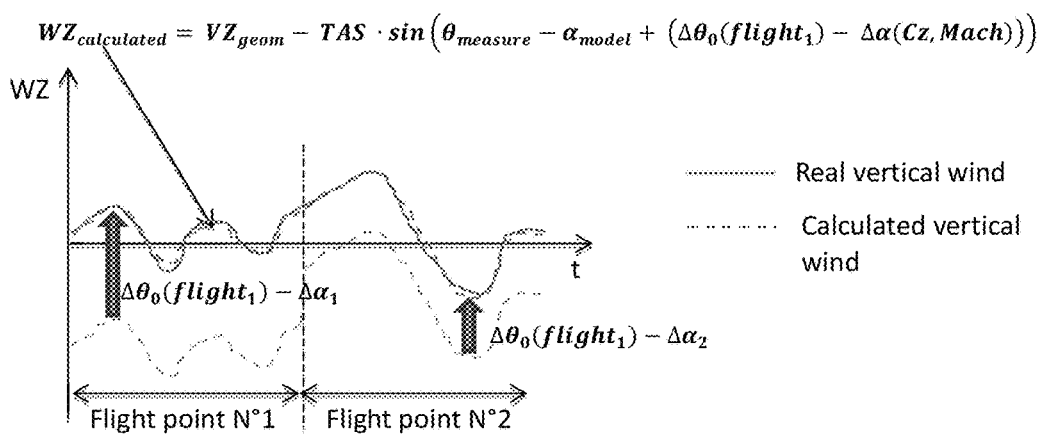

FIGURE 8
Before correction
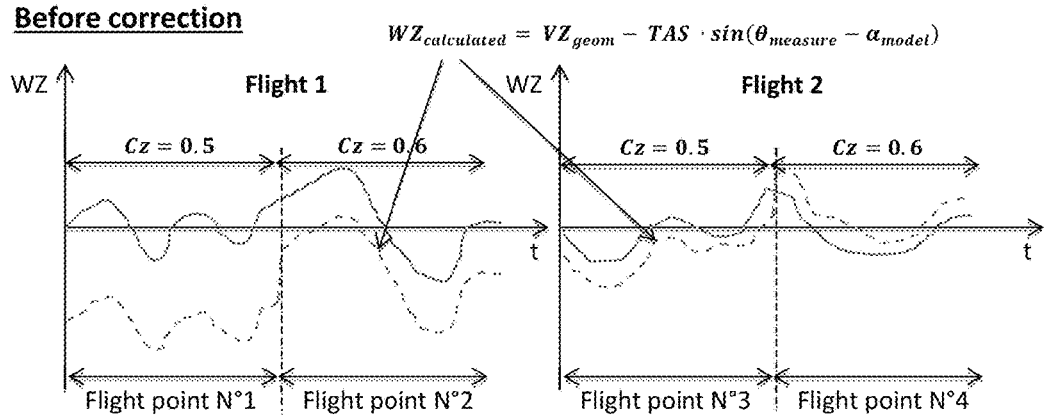
Variables:
$\Delta\theta_0(flight_1)$
$\Delta\theta_0(flight_2)$
$\Delta\alpha_1(Mach = 0.8, Cz = 0.5)$
$\Delta\alpha_2(Mach = 0.8, Cz = 0.6)$
Constraints:
$\langle WZ_{calculated}(flight_1)\rangle = 0$
$\langle WZ_{calculated}(flight_2)\rangle = 0$
$\langle WZ_{calculated}(Mach = 0.8, Cz = 0.5)\rangle = 0$
$\Delta\alpha_1 + \Delta\alpha_2 = 0$
After correction
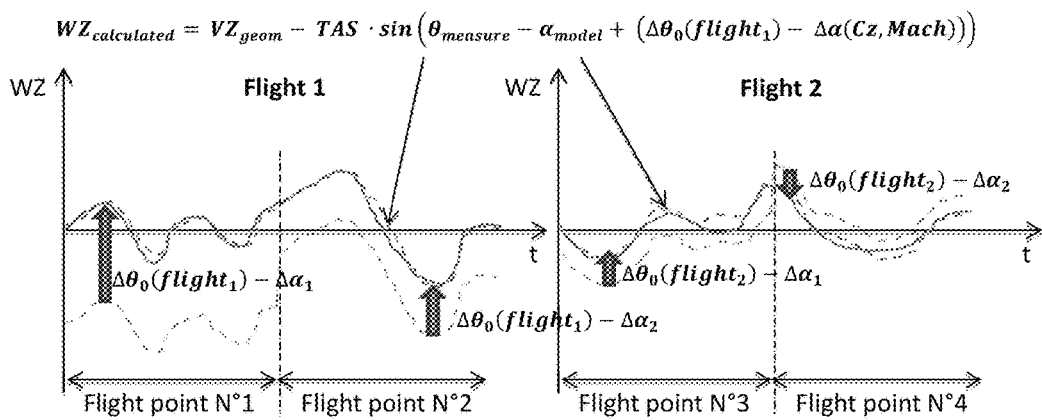

FIGURE 10
Correction
Variables:
$\Delta\theta_0$
$\Delta\alpha_1(Cz = 0.5)$
$\Delta\alpha_2(Cz = 0.6)$
Constraints:
$min\left(\sum_{p=1}^{4} WZ_p^2\right)$
and
$\Delta\alpha_1(Cz = 0.5) = 0$
After correction
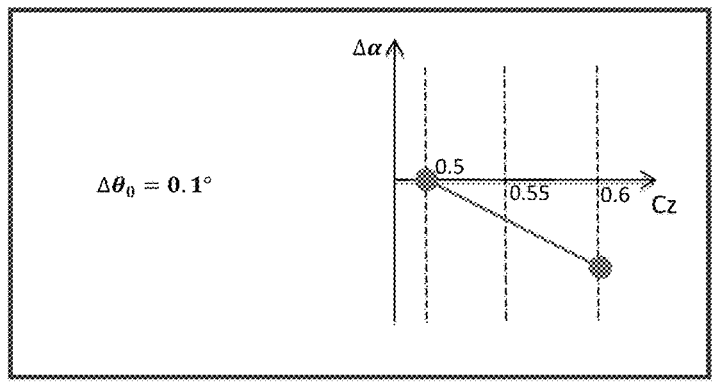
$\Delta\theta_0 = 0.1°$
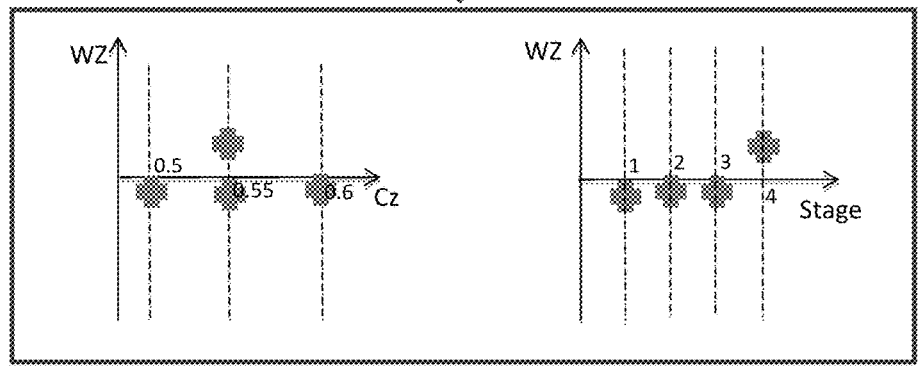
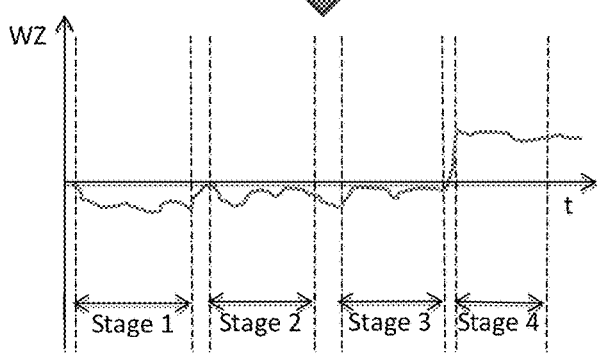

METHOD FOR CORRECTING THE CALCULATION OF A FLIGHT CHARACTERISTIC OF AN AEROPLANE BY TAKING VERTICAL WIND INTO ACCOUNT, METHOD FOR CALCULATING THE DRAG COEFFICIENT

The invention relates to a method of correcting the calculation of an airplane flight characteristic by taking account of vertical wind, and a method of calculating the drag coefficient is also described as an application of that method. The invention is implemented in aeronautics for determining the characteristics of airplanes.

Among the characteristics of an airplane, the drag coefficient of the airplane, written Cx, is important since the airplane may consume more or less fuel as a function of the value of Cx. This is thus a characteristic of very great economic interest, in particular for commercial airplanes.

Although it is possible to envisage calculating the drag coefficient Cx by computer simulation means, it nevertheless remains true that it is only from concrete in-flight measurements taken on board the airplane itself that it is possible to obtain a result that is closer to reality, given the number of elements that might influence the value of Cx.

However, although certain measurements are more and more accurate as a result of modern measurement means, there remain those that are more difficult to obtain with sufficient accuracy. This applies in particular for the vertical wind to which the airplane is subjected in flight. Furthermore, the accuracy of the measurements obtained may be high relatively speaking and not so high in absolute terms, it being possible for there to be measurement biases or even drift in the measurements.

In practice, because of these limitations, no account has been taken until now of the impact of vertical wind when calculating the characteristics of airplanes, or at least if any account has been taken of vertical wind, the results that could be obtained have not been of sufficient accuracy to be used with confidence.

The present invention proposes taking account of vertical wind with a method of correcting at least one result of calculating at least one airplane flight characteristic, in particular a drag coefficient of Cx of the airplane, said calculation being based on in-flight measurements and on values calculated from said measurements, the in-flight measurements being taken in at least one determined flight condition defining a determined flight point, each flight condition being defined by particular flight parameter values, each flight point corresponding to a determined combination of flight parameter values, of thus to a determined flight condition, said measurements and values being in particular:

$\theta_{measure}$ the measured pitch angle of the airplane and $\alpha_{model}$ the angle of attack of the airplane calculated by solving a lift equation and an aerodynamic model associating the angle of attack $\alpha$ of the airplane with at least one flight parameter, which is the lift coefficient Cz of the airplane.

Methods of calculating flight characteristics of an airplane and implementing corrections are known. In particular, the article "Test and Calibration of the DLR Falcon Wind Measuring System by Maneuvers" XP055207092 proposes correcting the measured angle of attack by adjusting in such a manner that the vertical wind becomes zero over an appropriate flight interval. That method requires the airplane to perform specific manoeuvres. For another parameter, a correction is undertaken by adjusting measured values and/or shifting them in time.

A thesis "Angle of attack and slideslip estimation using an inertial reference frame" by Joseph E. Zeis, XP055206887, also discloses the possibility of calculating an angle of attack in one particular circumstance. For this purpose, a model is proposed, but it is adapted to the particular circumstance taken into consideration and it is not adaptable.

In the method of the invention:
the pitch angle measurements $\theta_{measure}$ are corrected by a pitch angle correction term $\Delta\theta_0$; and
the calculated angles of attack $\alpha_{model}$ are corrected by an angle of attack correction term $\Delta\alpha(Cz\ldots)$; and
the pitch angle and angle of attack correction terms $\Delta\theta_0$ and $\Delta\alpha(Cz\ldots)$, are calculated under the constraint that the vertical wind WZ is practically zero on average.

The term "practically zero" means that the average of the wind needs to be taken to a value of zero or at least to the smallest possible value as a constraint in the calculations.

More precisely, the method of the invention corresponds to claim 1.

In order to evaluate the performance of an airplane, use is conventionally made of an aerodynamic model associating firstly the angle of attack of the airplane with other parameters, and in particular with the lift coefficient Cz, and secondly the drag coefficient Cx with other parameters, in particular the lift coefficient Cz. The term "aerodynamic model" is thus used to designate these two models taken together, except where one or the other of the models is specified explicitly: for example, the first model may be referred to as the "lift model" or "aerodynamic model associating the angle of attack with the lift coefficient Cz", and the second model may be referred to as the "drag model" or the "aerodynamic model associating the drag coefficient Cx with the lift coefficient Cz".

In various implementations of the invention, the following means may be used on their own or in any technically feasible combination:
the calculation is based on in-flight measurements by measurement means and on values calculated from said in-flight measurements during at least one flight, and the measurement means producing the measurements may suffer from bias;
the pitch angle correction term $\Delta\theta_0$ is calculated under the constraint that for each set of flights having the same measurement bias in a plurality of flights, the mean vertical wind WZ for all of the determined flight points of said flights is zero;
with a plurality of flights, and when the bias is the same for all the flights, the pitch angle correction term $\Delta\theta_0$ is calculated under the constraint that for all of the flights, the mean vertical wind WZ is zero for all of the determined flight points of said flights;
the pitch angle correction term $\Delta\theta_0$ is a constant that is common to a plurality of flights;
the pitch angle correction term $\Delta\theta_0$ is a constant that is particular for each flight;
the pitch angle correction term $\Delta\theta_0$ is variable;
the pitch angle correction term $\Delta\theta_0$ includes at least one particular constant for each flight;
the variable pitch angle correction term $\Delta\theta_0$ is the sum of a particular constant for each flight plus a linear variable of time, the linear variable of time correcting for any drift of the gyros of the airplane;
airplane measurements are taken on a single flight, N=1;

the flights are repeated in order to have airplane measurements over a set of N flights, where N is greater than one;

airplane measurements are taken over a determined number M of different flight conditions, M being greater than or equal to 1;

each flight condition corresponds to a flight point, it being possible for the same flight point to re-occur in different flights;

an airplane measurement corresponds to a given flight condition or a given flight point;

the airplane measurements are recorded for the determined flight points of the flights;

the angle of attack correction term $\Delta\alpha(Cz, \ldots)$ and the pitch angle correction term $\Delta\theta_0$ are calculated under their respective constraints of zero mean vertical wind speed by solving a system of equations including degrees of freedom, and when the number of degrees of freedom in the system is strictly positive, any redundant constraints are eliminated, and then additional constraints relating to the terms for correcting the angle of attack $\Delta\alpha(Cz, \ldots)$ and/or the pitch angle $\Delta\theta_0$ are added to said constraints of the system concerning the vertical wind, the number of additional constraints making it possible to have as many independent equations as there are variables in order to reduce to zero the number of degrees of freedom in the system with the additional constraint(s);

the angle of attack $\alpha_{model}$ of the airplane is calculated by solving a lift equation and an aerodynamic model associating the angle of attack of the airplane with the lift coefficient Cz of the airplane, and optionally with one or more of the following flight parameters (whence the . . . in the expressions such as for example: $\Delta\alpha(Cz, \ldots)$): a Mach number of the airplane, a total mass m of the airplane, a position of the center of gravity CG of the airplane;

the pitch angle correction term $\Delta\theta_0$ is calculated under the constraint that for each flight, the mean vertical wind WZ calculated for all of the determined flight points of said flight is practically zero;

when the pitch angle correction term $\Delta\theta_0$ is the sum of a particular constant for each flight plus a linear variable of time, the pitch angle correction term $\Delta\theta_0$ is calculated under the constraints that for each flight, the mean of the vertical wind WZ calculated for all of the determined flight points of said flight is practically zero, and the slope $$\left(\frac{\partial WZ}{\partial t}\right)$$

of the linear regression of the vertical wind WZ as a function of time is also practically zero;

when the measurement means include apparatuses that present drift over time, in particular gyros, a $\Delta\theta_0$ is used that is the sum of a particular constant for each flight plus a linear variable of time;

the angle of attack correction term $\Delta\alpha(Cz, \ldots)$ is calculated under the constraint that the mean vertical wind speed WZ is practically zero for each determined flight condition [Cz, . . . ];

the angle of attack of the airplane $\alpha_{model}$ is calculated by solving a lift equation and an aerodynamic model associating the angle of attack $\alpha$ of the airplane with the lift coefficient Cz of the airplane, and optionally with one or more of the following flight parameters: a Mach number of the airplane, a total mass m of the airplane, a position of the center of gravity CG of the airplane, and the pitch angle correction term $\Delta\theta_0$ is calculated under the constraint that for each flight, the mean vertical wind WZ calculated for all of the determined flight points of said flight is practically zero, and the angle of attack correction term $\Delta\alpha(Cz, \ldots)$ is calculated under the constraint that the mean vertical wind WZ calculated for each determined flight condition [Cz, . . . ] is practically zero;

the vertical wind WZ to which the airplane is subjected is calculated by:

$$WZ = VZ_{geom} - TAS \cdot \sin(\theta_{measure} - \alpha_{model} + (\Delta\theta_0 - \Delta\alpha(Cz, \ldots)))$$

where: $VZ_{geom}$ is the vertical speed of the airplane in the terrestrial reference frame, which is positive going upwards, and TAS is the true air speed of the airplane in the aerodynamic reference frame;

when only one single flight is undertaken and when the number of airplane measurements is less than a first threshold, an angle of attack correction term $\Delta\alpha(Cz, \ldots)$ of value zero is used by default: $\Delta\alpha(Cz, \ldots) = 0$.

when only one flight is undertaken and the number of airplane measurements is less than a first threshold, the vertical wind WZ is calculated by:

$$WZ = VZ_{geom} - TAS \cdot \sin(\theta_{measure} - \alpha_{model} + (\Delta\theta_0))$$

where: $VZ_{geom}$ is the vertical speed of the airplane in the terrestrial reference frame, which is positive going upwards, and TAS is the true air speed of the airplane in the aerodynamic reference frame;

when only one flight is undertaken, the airplane measurements are performed for a single flight condition or flight point;

when only one flight is undertaken, the airplane measurements are performed for a plurality of flight conditions or flight points;

the first threshold lies in the range three to ten airplane measurements;

the first threshold lies in the range three to five airplane measurements;

the first threshold is about ten airplane measurements;

the first threshold is about five airplane measurements;

the method is performed by a user;

the number of airplane measurements on a flight for the first threshold corresponds to all of the airplane measurements for one or more flight conditions;

when at least one flight is undertaken and when the number of airplane measurements is greater than a second threshold, the angle of attack correction term $\Delta\alpha(Cz, Mach, mass, CG, \ldots)$ is calculated by overall linear regression on all of the flights and by resolving by flight parameter Cz, Mach, mass, CG, . . . with:

$$\Delta\alpha(X_1, X_2, \ldots) = \Delta\alpha_0 + \sum_i (X_i - X_i^{ref}) \cdot \left(\frac{\partial \Delta\alpha}{\partial X_i}\right)$$

where: $\Delta\alpha_0$ is set by the user, and where $X_i$ corresponds to each flight parameter, Cz, Mach, mass, CG, . . . ;

the constraint then being that $$\left(\frac{\partial WZ}{\partial X_i}\right)$$

is zero, where $$\left(\frac{\partial WZ}{\partial X_i}\right)$$

is the mean of $$\frac{\partial WZ}{\partial X_i}$$

obtained by linear regression of WZ for each flight parameter WZ over all of the airplane measurements;

Δα$_0$ is set by the user to bring the number of degrees of freedom of the system of equations to be solved under constraint down to zero;

the second threshold is greater than or equal to the first threshold;

the second threshold lies in the range ten to one hundred airplane measurements;

the number of airplane measurements on the flight(s) for the second threshold corresponds to all of the airplane measurements for a plurality of flight conditions;

when at least one flight is undertaken and when the number of airplane measurements is greater than a third threshold, the angle of attack correction term Δα(Cz, Mach, mass, CG, . . . ) is calculated by overall multi-variable polynomial regression on all of the flights and by resolving by flight parameter Cz, Mach, mass, CG, with:

$$\Delta\alpha(X_1, X_2, \ldots) = \Delta\alpha_0 + \sum_i \left(X_i - X_i^{ref}\right) \cdot \left(\frac{\partial \Delta\alpha}{\partial X_i}\right) + \sum_i \sum_j \left(X_i - X_i^{ref}\right) \cdot \left(X_j - X_j^{ref}\right) \cdot \left(\frac{\partial^2 \Delta\alpha}{\partial X_i \partial X_j}\right) + \ldots$$

where each instance of the indices i and j corresponds to each flight parameter Cz, Mach, mass, CG, . . . , and where Δα$_0$ is set by the user;

the third threshold is greater than or equal to the second threshold;

the third threshold lies in the range one hundred to one thousand airplane measurements;

the third threshold is greater than one hundred airplane measurements;

the number of airplane measurements on the flight(s) for the third threshold corresponds to all of the airplane measurements for a plurality of flight conditions;

the angle of attack correction term Δα(Cz, . . . ) is calculated by interpolation in one or more tables of values;

the pitch angle correction and angle of attack correction terms Δθ$_0$ and Δα(Cz, . . . ) are calculated under the constraint of minimizing $$\sum_p WZ_p^2,$$

where the index p characterizes the various airplane measurements taken over all of the flights, while being limited to a determined flight envelope; and the airplane measurements are taken in a simplifying flight configuration corresponding to an airplane in level flight with a zero roll angle and with a stable engine speed.

The invention also provides a particular application of taking account of vertical wind in a method of calculating a drag coefficient Cx of an airplane based on in-flight measurements and on values calculated from said measurements.

In said method, the correction method of the invention is used to calculate the drag coefficient of Cx by means of a calculation formula taking account of vertical wind, said calculation formula including an aerodynamic slope angle term γ$_{aero}$ with γ$_{aero}$=(θ$_{measure}$+Δθ$_0$)−α$_{model}$+Δα(Cz, . . . )).

Advantageously, the drag coefficient Cx is calculated by:

$$Cx = \frac{-m \cdot \left(\frac{dV_{geom}}{dt} + \underline{a_{Coriollis}}\right) \cdot \underline{e_{x_h}^{aero}} + F_G \cdot \cos(\theta_{measure} + \Delta\theta_0 + \text{setting}) - RD \cdot \cos(\gamma_{aero})}{q \cdot S \cdot \cos(\gamma_{aero})} - Cz \cdot \tan(\gamma_{aero})$$

where:

γ$_{aero}$ is the aerodynamic slope;
$\underline{V_{geom}}$ is the speed vector in the terrestrial reference frame;
$\underline{e_x}^{aero}$ is the normalized vector collinear with the true airspeed vector;
$\underline{e_{x_h}}^{aero}$ is the normalized vector resulting from projecting the vector $\underline{e_x}^{aero}$ onto the horizontal plane;
m is the mass of the airplane;
F$_G$ is the gross thrust of the engines;
RD is the ram drag of the engines;
setting is the vertical setting angle of the engines relative to the axis of the airplane;
q is the reference dynamic pressure;
S is the reference surface area of the airplane; and
a$_{Coriolis}$ is the Coriolis acceleration due to the rotation of the earth.

The invention also provides a method in which the lift model of the airplane associating its Cz with other flight parameters, in particular with angle of attack, is reset by using the pitch angle and angle of attack correction terms Δθ$_0$ and Δα(Cz . . . ) calculated in accordance with the invention.

The term "resetting" a model is used to mean modifying a model in order to make it as consistent as possible with the measurements taken during in-flight testing.

The invention also provides a computer program including program code instructions stored on a computer readable medium and enabling the methods of the invention to be performed.

In the context of the invention, the flight parameters are in particular: a Mach number of the airplane, a total mass m of the airplane, a position of the center of gravity CG of the airplane, and the lift coefficient Cz. Concerning the distinction between in-flight measurements and values calculated from said in-flight measurements, by way of example the Mach number is a measurement while the lift coefficient Cz is a value calculated from the measurements by using an engine thrust model and possibly an aerodynamic drag model of the airplane: the lift model of the airplane is not used at this stage. The lift coefficient Cz is thus calculated from measurements and from calculated values obtained from those measurements, the pitch angle and angle of attack correction terms $\Delta\theta_0$ and $\Delta\alpha(Cz \ldots)$ not being involved at this level. Specifically, the Cz is calculated and then "frozen" for subsequent use, i.e. the same thrust model is retained and the impact of a modification to the drag model is assumed to be negligible, and in addition the method of correcting the pitch angle and the angle of attack is assumed to have no more than a negligible impact on Cz: it is naturally possible to reintroduce these corrections if so desired by performing a loop, but in general, since such corrections are of the order of a few tenths of a degree at most, their impact on Cz is negligible. It is thus assumed herein that Cz is data input into the method of correcting pitch angle and angle of attack. A flight condition or a flight point, where these terms are equivalent, is defined by a set of flight parameters [Cz, Mach, mass, CG, Re, altitude, ...] having particular values. A flight envelope corresponds to predefined ranges of measurements and of flight parameter values [$Mach_0$, $Cz_0$, $mass_0$, $CG_0$, ...] for the aerodynamic model used during the calculations, for example $0.4 \leq Cz \leq 0.5$ and $0.8 \leq Mach \leq 0.85$. Finally, a flight characteristic is a calculated value corrected by using the pitch angle and angle of attack correction terms $\Delta\theta_0$ and $\Delta\alpha(Cz \ldots)$, and by way of example it is the drag coefficient Cx of the airplane that it is desired to obtain accurately, so this is the coefficient that is corrected. In this context, vertical wind, which can be calculated with correction and is thus a calculated value, can also be considered as being a flight characteristic.

In addition to using Cz for calculating Cx at each instant of a flight, it is also possible to correct the lift model $Cz=f(angle\ of\ attack, \ldots)$ that was initially used. The model associating Cz with the angle of attack can thus be corrected. Specifically, once Cz has been calculated, a first estimate of the angle of attack is made by using the initial model $Cz=f(angle\ of\ attack, \ldots)$, and then a correction to this angle of attack is introduced. Specifically, the correction is of the type $\Delta(angle\ of\ attack)=f(Cz, \ldots)$, which can be transformed into $\Delta(Cz)=f(angle\ of\ attack, \ldots)$ thereby correcting the model $Cz=f(angle\ of\ attack, \ldots)$ and not the values of Cz during the flight, which themselves remain unchanged. To do this, attention is given only to the envelope where Cz increases with angle of attack, i.e. attention is not given to the envelope beyond the stalling angle of attack. The bijective nature of the function $angle\ of\ attack=f(Cz, \ldots)$ giving the angle of attack as a function of Cz, where the angle of attack in this example is the sum of $\alpha_{model}$ plus $\Delta\alpha(Cz \ldots)$, makes it possible for the relationship to be inverted to give $Cz=f(angle\ of\ attack, \ldots)$.

With the method of the invention, it is thus possible initially to calculate the lift coefficient Cz on the basis of an engine thrust model and possibly of an aerodynamic drag model of the airplane, and subsequently to calculate the pitch angle and angle of attack correction terms $\Delta\theta_0$ and $\Delta\alpha(Cz, \ldots)$, after which the lift model $Cz=f(angle\ of\ attack, \ldots)$ is corrected by making use at least of the angle of attack correction term $\Delta\alpha(Cz, \ldots)$.

It thus becomes possible to obtain a lift model $Cz=f(angle\ of\ attack, \ldots)$ corrected from an initial lift model $Cz=f(angle\ of\ attack, \ldots)$ in which, after determining of the pitch angle and angle of attack correction terms $\Delta\theta_0$ and $\Delta\alpha(Cz \ldots)$ by the method of the invention, said angle of attack correction terms $\Delta\alpha(Cz \ldots)$ are used for correcting the initial lift model $Cz=f(angle\ of\ attack, \ldots)$.

The present invention, although not being limited thereto, is exemplified below with the following description of embodiments and implementations given with reference to:

Figure 3:
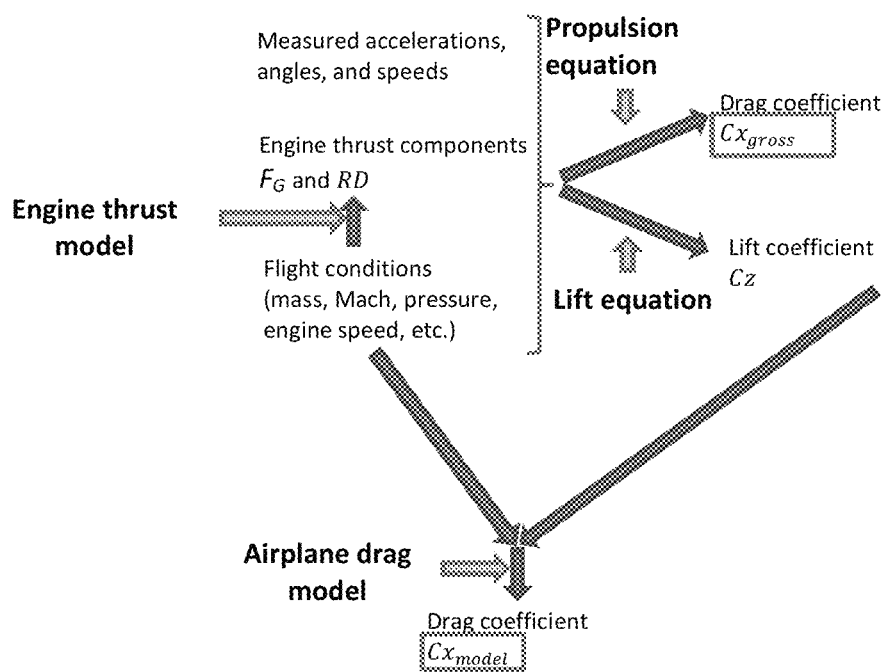
Figure 4:
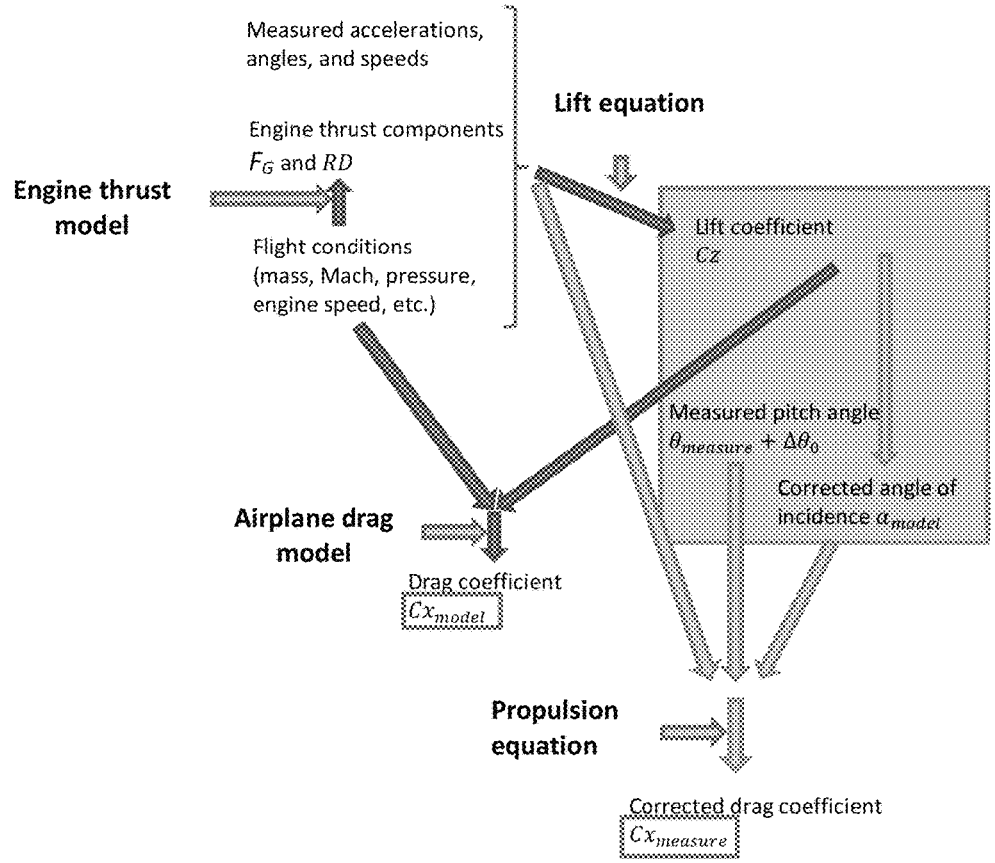
Figure 5:
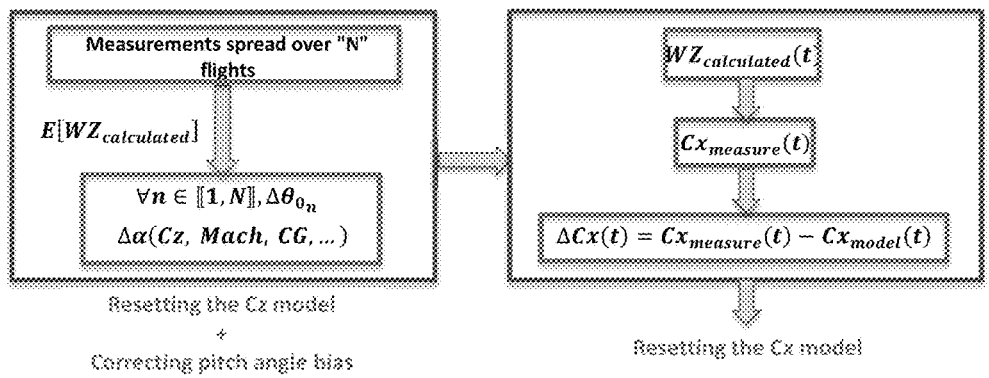
Figure 9:
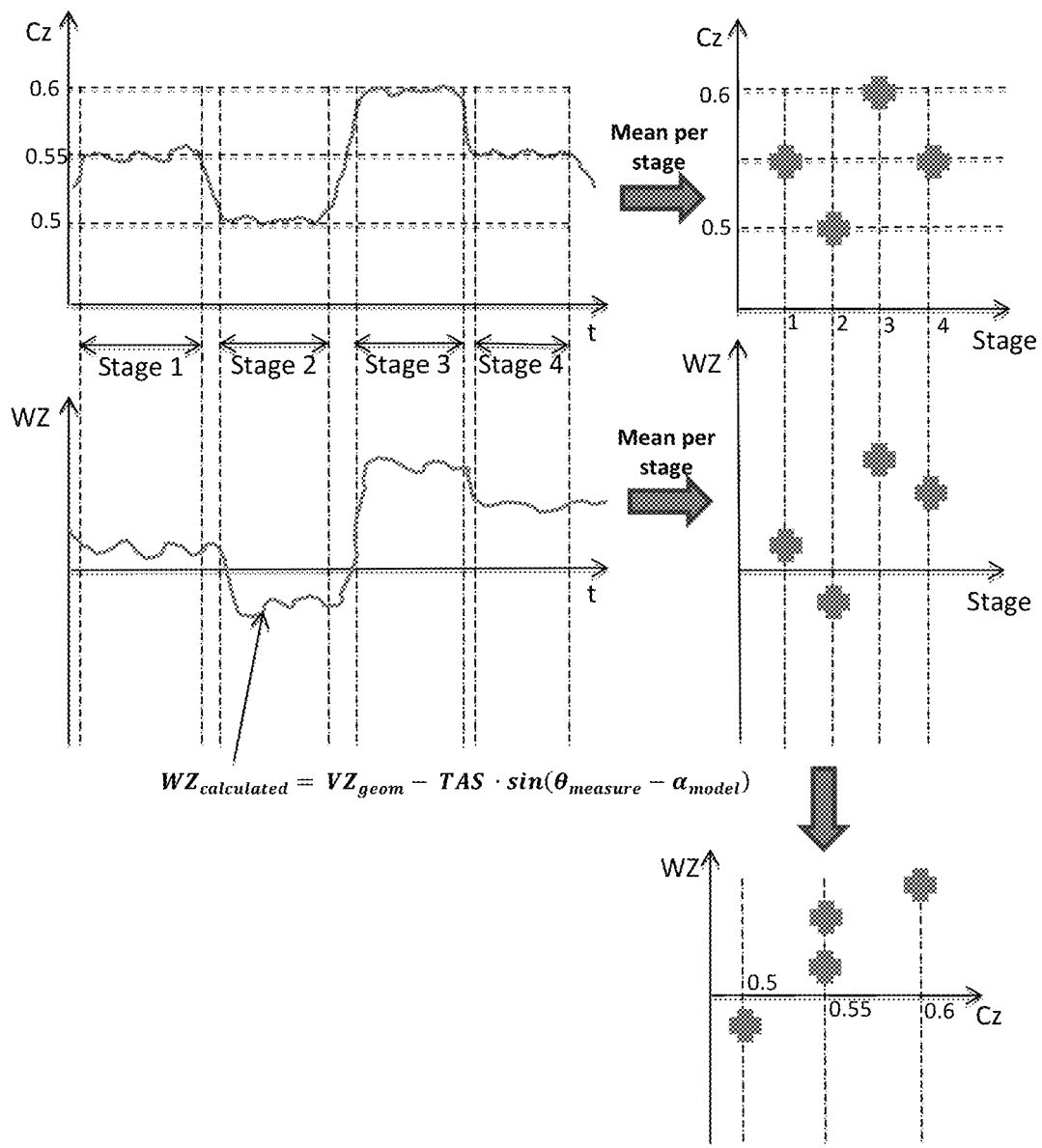

FIG. 3 is a diagram showing a prior art method for obtaining a drag coefficient $Cx_{gross}$ by direct application of measurements and values obtained from said measurements to a propulsion equation of the airplane without taking account of vertical wind, or while taking account of vertical wind solely on the basis of measurements (pitch angle and angle of attack), which measurements may be undertaken during a prior calibration stage;

FIG. 4 is a diagram showing the method of the invention for obtaining a drag coefficient $Cx_{measure}$ corrected by applying measurements and values to a propulsion equation of the airplane, in which measurements and values the measured pitch angle has been corrected and the angle of attack calculated from an angle of attack model has been corrected;

FIG. 5 is a diagram showing the method for successively resetting the lift model associating Cz in particular with the angle of attack and used herein to calculate the angle of attack from the Cz calculated from airplane measurements and then calculating the corrected drag coefficient $Cx_{measure}$ from the measurements and values obtained during flights;

FIGS. 6, 7, and 8 show three examples of calculating correction terms with different numbers of flights and flight conditions; and FIGS. 9 and 10 show the correction terms being calculated with the method of minimizing $$\sum_p WZ_p^2.$$

There follows a description of the principle on which the invention is based in which vertical wind WZ is calculated, followed by an application to calculating the drag coefficient Cx. In order to simplify the explanations below, it is assumed that the gyros of the airplane do not drift during flight, and as a result a pitch angle correction term $\Delta\theta_0$ is used that is a constant particular to each flight. Likewise, still for simplifying explanations, it is assumed that the pitch angle bias of each flight is independent from the other flights. Nevertheless, the invention can be implemented either with a pitch angle correction term $\Delta\theta_0$ that is a variable and that varies linearly as a function of time during each flight in order to take account of drift of the gyros of the airplane, if any, or on the contrary with a pitch angle bias that is constant and common to a plurality of flights.

The term "airplane measurement" corresponds to measuring a set of parameters of the airplane, e.g. its geometrical speed, its airspeed, its pitch angle, etc., over a certain duration.

In order to be able to take account of the vertical wind so as to be able to correct the airplane measurements and/or the values resulting from calculations based on the airplane measurements, it is proposed to calculate the vertical wind speed $WZ_{calculated}$ from pitch angle measurements of the airplane, from vertical speed measurements in a terrestrial reference frame, and from an aerodynamic model associating the angle of attack of the airplane with at least one coefficient which is the lift coefficient Cz of the airplane.

Below, the following notation is used:
W is the wind vector;
WX is the horizontal component of the wind, which is positive going forwards, in meters per second (m·s$^{-1}$);
WZ is the vertical component of the wind, which is positive going upwards, in m·s$^{-1}$;
E[X] is the expected value of the variable X;
<X> is the mean value of X;
Cz is the lift coefficient of the airplane;
Cx is the drag coefficient of the airplane;
θ is the pitch angle of the airplane in radians;
α is the angle of attack of the airplane in radians;
$\gamma_{aero}$ is the aerodynamic slope in radians;
TAS is the true speed of the airplane in the aerodynamic reference frame, in m·s$^{-1}$;
$\underline{V_{geom}}$ is the speed vector in the terrestrial reference frame, in m·s$^{-1}$;
$VZ_{geom}$ is the vertical speed of the airplane in the terrestrial reference frame, which is positive going upwards, in m·s$^{-1}$;
$VZ_{aero}$ is the vertical speed of the airplane in the aerodynamic reference frame, which is positive going upwards, in m·s$^{-1}$;
$\underline{e_x^{aero}}$ is the normalized vector collinear with the true airspeed vector $\underline{TAS}$;
$\underline{e_z^{aero}}$ is the normalized vector normal to the true airspeed vector $\underline{TAS}$, in the vertical plane, an upwardly directed;
$\underline{e_{x_h}^{aero}}$ is the normalized vector resulting from projecting the vector $\underline{e_x^{aero}}$ onto the horizontal plane;
m is the total mass of the airplane in kilograms (kg);
$F_G$ is the gross thrust of the engines, in newtons (N);
RD is the ram drag of the engines, in N;
setting is the vertical setting angle of the engines relative to the axis of the airplane, in radians;
q is the reference dynamic pressure, in pascals (Pa);
S is the reference area of the airplane, in square meters (m$^2$);
g is the acceleration due to gravity, in meters per second per second (m·s$^{-2}$);
$a_{Coriolis}$ the Coriolis acceleration, in m·s$^{-2}$;
CG is the longitudinal position of the center of gravity, in meters (m) or in % mean aerodynamic chord;
Re is the Reynolds number (dimensionless parameter) obtained for a reference length of 1 m corresponding to the flight conditions of the airplane; and
Altitude is the altitude of the airplane, in m.

It should be observed that the flight parameter CG, which is the position of the center of gravity, is mentioned herein by way of information, since this parameter is not used directly in calculating the vertical wind, but it may nevertheless be involved in the aerodynamic model of the airplane, in particular as a function of the accuracy of the model or of the formulation selected for the model. The same applies to the flight parameters Altitude and Re, which might be used in the aerodynamic model of the airplane.

Figure 1:
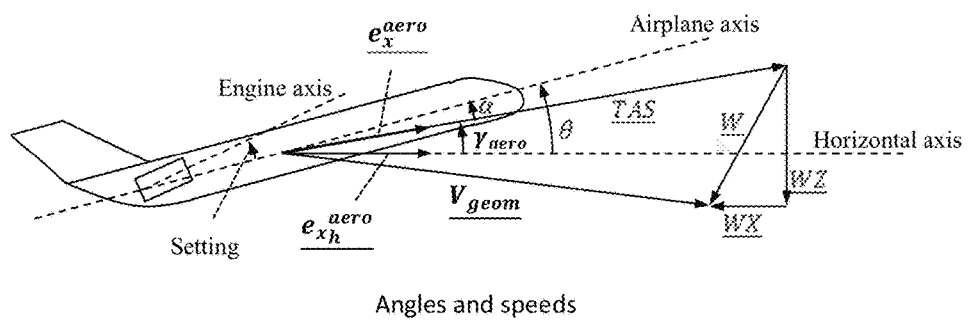
FIG. 1 is a diagram of an airplane with various axes relating essentially to angles and speeds in flight, and also to resolving the wind vector.
Figure 2:
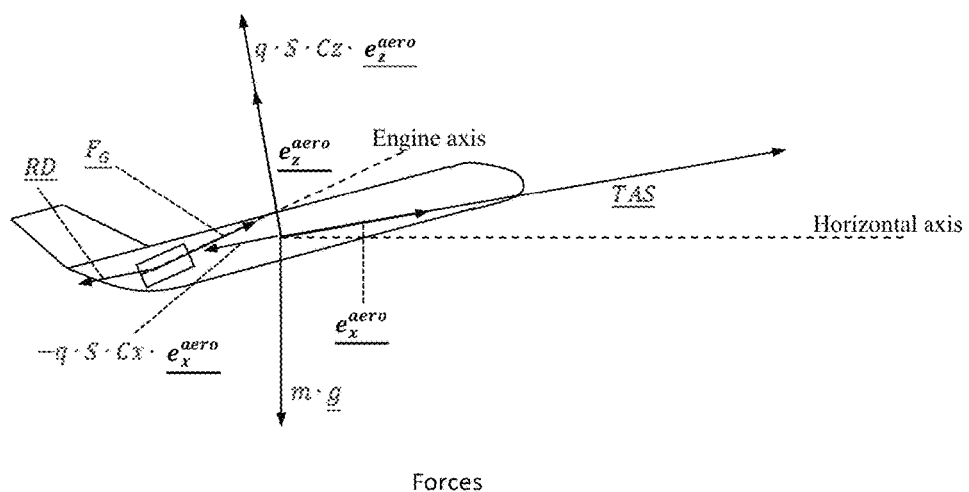
FIG. 2 is a diagram of an airplane with various axes relating essentially to the forces involved in flight.

FIGS. 1 and 2 serve to visualize some of these notations in association with the airplane for which it is desired to determine/calculate characteristics.

In order to be able to calculate the vertical wind, it is necessary to know accurately the measured airplane pitch angle, and to have an accurate model that serves to give the angle of attack of the airplane at each instant. To do this, an assumption that the vertical wind is, on average, zero, is transformed into two sub-assumptions: vertical wind is zero on average per flight, and vertical wind is zero on average for each flight condition.

The invention is thus based on an initial assumption that the mean vertical wind $WZ_{real}$ to which an airplane is subjected in flight is zero. It is then possible to write: $E[WZ_{real}]=0$, which is transformed into $E[WZ_{calculated}]=0$.

This assumption can be represented in two ways:
For a flight that is sufficiently long, and in particular travelling over a geographical zone that is not too small, it may be assumed that: $\langle WZ \rangle_{flight}=0$. This may be extended to a set of flights: $\langle WZ \rangle_n=0$ where n is an index, for which each instance corresponds to a different flight.

For a flight point defined by a determined combination of values for a set of flight parameters [Mach$_0$, Cz$_0$, mass$_0$, CG$_0$, . . . ], if sufficient airplane measurements or recordings have been taken under the same determined flight conditions, possibly over a variety of flights, it can then be assumed that:

$(WZ_{calculated}(\text{Mach}_0, Cz_0, \text{mass}_0, CG_0, \ldots))=0$ it is also possible to represent the independence of the vertical wind and of the flight conditions, e.g. by imposing $$\left\langle \frac{\partial WZ_{calculated}}{\partial X_i} \right\rangle = 0$$

(where $X_i$ may be the Mach number, the Cz, . . . and $$\left\langle \frac{\partial WZ_{calculated}}{\partial X_i} \right\rangle$$

corresponds to the slope of a linear regression of $WZ_{calculated}$ as a function of $X_i$).

On the basis of these assumptions, and by using the flight measurements of the airplane, in particular its pitch angle θ and its vertical speed $VZ_{geom}$ in the terrestrial reference frame, it is possible to reset the aerodynamic model used for establishing the relationship between the lift coefficient Cz(α, Mach, mass, CG, . . . ) of the airplane and its angle of attack α. From this reset model and still using the same measurements, it is then possible to calculate the vertical wind, for each instant of the flight compatible with the aerodynamic model in use. It should be observed that a model of the airplane engine is also used for calculating values for F and RD, that are involved in calculating the lift coefficient Cz, and above all in calculating the drag coefficient Cx.

By taking account of this vertical wind in the propulsion equation that is used for calculating the drag coefficient $Cx_{measure}$ from measurements and values obtained during flights, the drag calculated from these measurements is made more accurate and more robust.

In order to calculate this corrected drag coefficient $Cx_{measure}$, it is possible to use any propulsion equation that can be found in the literature (for example: "Fundamentals of Airplane Flight Mechanics" by David G. Hull, page 22, 1$^{st}$ equation of 2.20) while making sure beforehand that the terms that are ignored or the simplifications that are used are appropriate for the flight conditions.

By applying the fundamental principles of dynamics in the terrestrial reference frame, in the horizontal plane, and along the vector $\underline{e_{x_h}^{aero}}$, the following is obtained:

$$m \cdot \frac{dV_{geom}}{dt} \cdot \underline{e_{x_h}^{aero}} =$$

$F_G \cdot \cos(\theta_{measure}+\Delta\theta_0+\text{setting})-RD\cdot\cos(\gamma_{aero})-q\cdot S\cdot\cos(\gamma_{aero})\cdot Cx_{measure}-q\cdot S\cdot Cz\cdot\sin(\gamma_{aero})-m\cdot \underline{a_{Coriolis}} \cdot \underline{e_{x_h}^{aero}}$ With $$\gamma_{aero} = (\theta_{measure} + \Delta\theta_0) - (\alpha_{model} + \Delta\alpha(Cz, Mach, mass, CG, \ldots)).$$

i.e.: $Cx_{measure} =$ $$-m \cdot \left(\frac{dV_{geom}}{dt} + \underline{a_{Coriolis}}\right) \cdot \underline{e_{x_h}^{aero}} + \frac{F_G \cdot \cos(\theta_{measure} + \Delta\theta_0 + \text{setting}) - RD \cdot \cos(\gamma_{aero})}{q \cdot S \cdot \cos(\gamma_{aero})} - Cz \cdot \tan(\gamma_{aero})$$

There follow examples of calculating the vertical wind, which examples are not limiting.

In order to simplify explanation, it is assumed herein that the airplane is in a flight configuration that corresponds to stabilized flight with a zero roll angle and with a stabilized engine speed.

The vertical wind $WZ_{calculated}$ may be calculated from in-flight measurements and from values calculated on the basis of said measurements, in particular from $\theta_{measure}$, $VZ_{geom}$, $\alpha_{model}$, where $\alpha_{model}$ is the angle of attack of the airplane calculated from a lift equation and from an aerodynamic model associating the airplane lift coefficient with this angle of attack.

On the basis of the following relationships:

$$WZ_{calculated} = VZ_{geom} - VZ_{aero}$$

$$VZ_{aero} = TAS \cdot \sin(\gamma_{aero})$$

$$\theta = \alpha + \gamma_{aero}$$

the following is obtained:

$$WZ_{calculated} = VZ_{geom} - TAS \cdot \sin(\theta_{measure} - \alpha_{model})$$

The angle of attack $\alpha_{model}$ from the aerodynamic model is obtained by applying a lift equation that may be selected as a function of the desired accuracy.

For example, it is possible to use the following lift equation:

$$m \cdot \frac{dV_{z_{geom}}}{dt} = q \cdot S \cdot \left(Cz \cdot \sqrt{1 - \left(\frac{V_{z_{geom}}}{TAS}\right)^2} - Cx \cdot \frac{V_{z_{geom}}}{TAS}\right) + F_G \cdot \sin(\theta_{measure} + \text{setting}) - RD \cdot \frac{V_{z_{geom}}}{TAS} - m \cdot \left(g + \underline{a_{Coriolis}} \cdot \underline{e_z^{geom}}\right)$$

where $\underline{e_z^{geom}}$ is a normalized vector that is vertical in the terrestrial reference frame and upwardly directed. This equation assumes a vertical wind that is small, which is typical of conditions encountered in a calm atmosphere.

The following can be deduced from this lift equation:

$$Cz = \frac{\left[m \cdot \frac{dV_{z_{geom}}}{dt} - F_G \cdot \sin(\theta_{measure} + \text{setting}) + RD \frac{V_{z_{geom}}}{TAS} + m \cdot \left(g + \underline{a_{Coriolis}} \cdot \underline{e_z^{geom}}\right)\right]}{q \cdot S \sqrt{1 - \left(\frac{V_{z_{geom}}}{TAS}\right)^2}} + Cx \cdot \frac{V_{z_{geom}}}{TAS}$$

If the flight points are carried out in level flight $$\left(\frac{V_{z_{geom}}}{TAS} \ll 1\right),$$

the formula may be simplified as follows:

$$Cz = m \cdot \frac{dV_{z_{geom}}}{dt} - F_G \cdot \sin(\theta_{measure} + \text{setting}) + m \cdot \left(g + \underline{a_{Coriolis}} \cdot \underline{e_z^{geom}}\right)$$

In contrast, if it is desired not to ignore any of the terms, then the preceding formula should be retained, e.g. calculating Cx by looping, using the drag model of the airplane in order to estimate it, i.e. with $Cx = Cx_{model}$. A first estimate for Cz is made by assuming Cx=0, and then by successive iterations until reaching a desired level of convergence, with Cz being recalculated using the value for Cx obtained from the initial drag model, and the value for Cz calculated at the preceding iteration.

Likewise, the model used for establishing the relationship between the lift coefficient Cz and the angle of attack $\alpha$ of the airplane may be more or less accurate. As an example of a simple relationship, mention may be made of: $Cz = Cz_0 + Cz_\alpha \cdot \alpha$, and for a more complex relationship:

$$Cz = Cz_0(CG, Mach) + Cz_\alpha(CG, Mach) \cdot \alpha + \Delta Cz_{NL}(\alpha, Mach).$$

Each airplane manufacturer predefines its aerodynamic model and the flight condition(s) for which it is valid. In practice, the predefined flight conditions in question make it possible to predefine a flight envelope in which the model is valid. The corresponding flight condition(s) is/are thus used for the airplane measurements for use in calculating the characteristics of the airplane. In general, a simplifying flight configuration is associated with these predefined flight conditions: the airplane is in stabilized flight with a zero roll angle, and the engine speed is stabilized.

From experience, it is assumed that the airplane pitch angle measurement $\theta_{measure}$ may be biased, and that this bias may differ from one flight to another, but that it remains constant throughout each flight.

The error of the model $Cz(\alpha, Mach, mass, CG, \ldots)$ for the lift coefficient is equivalent to an error $\Delta\alpha(Cz, Mach, mass, CG, \ldots)$, since the Cz is calculated from the airplane measurements and the model $Cz(\alpha, Mach, mass, CG, \ldots)$ is used to deduce the angle of attack $\alpha_{model}$ therefrom.

The relationship $\gamma_{aero} = \theta_{measure} - \alpha_{model}$ thus becomes:

$$\gamma_{aero} = (\theta_{measure} + \Delta\theta_0) - (\alpha_{model} + \Delta\alpha(Cz, Mach, mass, CG, \ldots))$$

Whence:

$$WZ_{calculated} = VZ_{geom} - TAS \cdot \sin(\theta_{measure} - \alpha_{model} + (\Delta\theta_0 - \Delta\alpha(Cz, Mach, mass, CG, \ldots)))$$

Making the assumption that for each flight, the mean vertical wind encountered by the airplane is more or less zero, and the fact that the bias of the pitch angle measurement may vary from one flight to another, $\Delta\theta_0(\text{flight}_n)$ is determined in such a manner as to have $<WZ_{calculated}>_{flight_n} = 0$, and thus for each flight of index n, $n = [1 \ldots N]$ and $N >= 1$, when there is a set of N flights.

Depending on the density of airplane measurements obtained/recorded in a flight envelope corresponding to predefined flight parameter values $[Mach_0, Cz_0, mass_0, CG_0, \ldots]$ in the aerodynamic model used, e.g. $0.4 \leq Cz \leq 0.5$ and $0.8 \leq Mach \leq 0.85$, it is possible to use methods that are more or less accurate for correcting the angle of attack model. It should be recalled that the constraint imposed for the calculations is to ensure that for every flight point:

(WZ(Cz, Mach, mass, CG, . . . ))=0 or an equivalent formulation that represents the independence of vertical wind from the flight conditions. This latter condition may be expressed in various ways depending on the density of airplane measurements in the flight envelope under consideration.

These determinations are undertaken by adjusting the set of variables $(\Delta\theta_{0_n})_{1\leq n\leq N}$, where N is the number of flights (index n) and:

$\Delta\alpha_0$ and $$\left(\frac{\partial \Delta\alpha}{\partial X_i}\right)_{1\leq i\leq Q}$$

(Q being the number of variables on which the angle of attack depends) if opting for a correction of linear type (the airplane measurements are obtained for a plurality of flight conditions or flight points in order to be able to perform at least one linear regression); or $$\cdot \Delta\alpha_0, \left(\frac{\partial \Delta\alpha}{\partial X_i}\right)_{1\leq i\leq Q}, \left(\frac{\partial^2 \Delta\alpha}{\partial X_i \partial X_j}\right)_{1\leq i\leq Q, 1\leq j\leq Q},$$

etc. (Q being the number of variables on which the angle of attack depends) if opting for a correction of multi-variable polynomial type; or $(\Delta\alpha_k(Cz, Mach, mass, CG, . . . ))_{1\leq k\leq R}$ (R being the number of data points between which interpolation is performed) if selecting correction obtained by interpolation in one or more tables of values.

This is typically undertaken by using optimization methods. Various optimization methods for solving these problems may be used: by way of example, it is possible to use a quasi-Newton method (e.g. BFGS method (cf p. 72 "Optimization: Algorithms and Applications" by Rajesh Kumar Arora)). These optimization methods are already available in a certain number of computer languages (Matlab, python, etc.). To solve equation systems of the form $\forall i, f_i(x)=0$, it is possible to transform the system of equations into a problem of minimizing $$\sum_i (f_i(x))^2.$$

The purpose of this optimization process is to end up with: $\forall i\in [[1,N]]$, <WZ(flight n)>=0 and $$\cdot \forall i \in [\![1, Q]\!], \frac{\partial WZ}{\partial X_t} = 0$$

if a linear correction was selected. It is then necessary to fix the value of $\Delta\alpha_0$ in order to have the right number of degrees of freedom for making it possible to solve the system of equations under constraints in unique manner; or $$\cdot \forall i \in [\![1, Q]\!], \frac{\partial WZ}{\partial X_t} = 0, \forall (i, j) \in 1, Q^2, \frac{\partial^2 WZ}{\partial X_i \partial X_j} = 0,$$

etc. if a multi-variable polynomial correction was selected. It is then necessary to fix the value of $\Delta\alpha_0$ to have the right number of degrees of freedom; or $\forall k\in[[1,R]]$, WZ(condition k)=0 if correcting by interpolation in one or more tables of values was selected and sufficient airplane measurements were made in each flight condition; or by minimizing $$\sum_p WZ_p^2$$

if correction by interpolation in one or more tables of values was selected, where the index p characterizes the various airplane measurements taken during all of the flights while being limited to a determined flight envelope. This selection gives much greater flexibility in carrying out test flights than the preceding selection, since there is no need to be limited to the flight conditions of the correction tables, and it is possible to scan through the entire desired flight envelope without constraint.

Depending on the number of variables in the correction model (e.g. Q+1 variables for the linear correction $$\left(\frac{\partial \Delta\alpha}{\partial X_i}\right)_{1\leq i\leq Q}),$$

it is necessary to have available a certain number of airplane measurements taken under conditions that are compatible with the assumptions of the engine model and of the aerodynamic model, and thus, in general, we have a roll angle of zero, and a stabilized engine speed, with typically about ten airplane measurements per variable. This number naturally depends on the uncertainty of each measurement and on the desired accuracy.

A measurement corresponds to taking/recording the value of a given measured parameter. For a given flight point, during a single flight or during different flights, it is possible to take/record one or more values of the various parameters being measured and thus, for each flight point, it is possible to have a plurality of measurements each corresponding to a measurement of a given parameter. It should be recalled that the term "airplane measurement" corresponds to the set of parameter measurements necessary for applying the method, which measurements are recorded for each measurement stage.

It can thus be understood that if the number of airplane measurements for each flight is large and if the density of airplane measurements in the flight envelope is considerable, then the results will have better accuracy, while complying with the flight conditions predefined for the models, and in particular for the aerodynamic model.

The measurements are typically recorded for subsequent use with calculation of the characteristics of the airplane being deferred. Although, preferably, the calculations are performed in deferred time in order to be able to collate the measurements and any values collected during the flight and preceding flights, it is also possible to envisage performing calculations progressively, in real time, during each flight, which calculations thus become progressively more refined as each flight is taking place.

In practice, measurements are obtained during measurement stages, each of which lasts for a certain length of time that can depend on numerous factors. A measurement stage may thus last anywhere in the range a few seconds to a few minutes.

The calculations are performed in a computer or programmable calculator that receives the data as input, and in particular the measurements and any calculated values recorded during the flight. The data is identified by time and possibly also by flight, even though any one particular flight can always be found as a function of its time identity. The flight conditions may be determined a priori, possibly being recorded together with the data, or they may be determined a posteriori on the basis of the recorded data. Specifically, the flight conditions may be determined a priori, e.g. the pilot may decide that particular flight conditions have been entered and that these conditions may optionally be recorded together with the corresponding data. They may alternatively be determined automatically a posteriori on the basis of the measurements and the recorded values corresponding to the flight parameters [$Mach_0$, $Cz_0$, $mass_0$, $CG_0$, ...], the computer or programmable calculator classifying the measurements and values by flight condition and conserving those that are usable for the calculations, in particular those that satisfy the flight conditions predefined for the models, and where necessary the predefined simplifying flight configuration.

Some of the calculated values may be calculated while measurements are being taken, in real time, and they may be recorded, while others may be calculated subsequently on the basis of the measurements that are recorded. Thus, when it is stated that measurements and values calculated from said measurements are recorded for determined flight points of the flight(s), that should be considered as being equivalent to recording the measurements and subsequently calculating calculated values on the basis of those recorded measurements.

Consideration may be given to the situation in which the density of airplane measurements is very low. By way of example, this may apply if only one flight is undertaken, which gives: N=1, with only a few airplane measurements, whether they are for:

a single flight condition or flight point, i.e. M=1, e.g. with 3 to 5 airplane measurements; or a plurality of flight conditions or flight points, e.g. with M=3 to 5, with a single airplane measurement per flight point.

It can be understood that this very low density of airplane measurements may correspond to other combinations of flight points or flight conditions and of numbers of airplane measurement(s) per flight point or flight condition during a single flight.

Under such circumstances, with a very low density of airplane measurements, the pitch angle bias $\Delta\theta_0$ is corrected, since it is then possible to consider that $\Delta\alpha_0$ and the other corrective terms are zero. Specifically, under such circumstances, there are not enough airplane measurements to correct the angle of attack model. There is thus only one correction term, $\Delta\theta_0$, to be used, and the vertical wind formula becomes:

$WZ_{calculated} = VZ_{geom} - TAS \cdot \sin(\theta_{measure} - \alpha_{model} + (\Delta\theta_0))$.

For medium airplane measurement density, e.g. in the range about 10 to a few hundreds of airplane measurements in all the flight envelope under consideration, it is possible to impose the constraint $$\left(\frac{\partial WZ_{calculated}}{\partial X_i}\right) = 0$$

using linear regressions, with this applying for each $X_i$ constituting a flight parameter, where $X_i$ can thus be Mach, Cz, ..., with the variables being $$\left(\frac{\partial \Delta\alpha}{\partial X_i}\right).$$

This then gives rise to a correction of the following type:

$$\Delta\alpha(X_1, X_2, ...) = \Delta\alpha_0 + \sum_i (X_i - X_i^{ref}) \cdot \left(\frac{\partial \Delta\alpha}{\partial X_i}\right).$$

For a high density of airplane measurements, e.g. several hundreds to several thousands of airplane measurements in the flight envelope under consideration, it is possible to increase the accuracy of the results by a multi-variable polynomial regression using a correction of the following form:

$$\Delta\alpha(X_1, X_2, ...) = \Delta\alpha_0 + \sum_i (X_i - X_i^{ref}) \cdot \left(\frac{\partial \Delta\alpha}{\partial X_i}\right) + \sum_i \sum_j (X_i - X_i^{ref}) \cdot (X_j - X_j^{ref}) \cdot \left(\frac{\partial^2 \Delta\alpha}{\partial X_i \partial X_j}\right) + ...$$

where i and j are the indices for the parameters [Mach, Cz, ...]. This calculation is based on the following constraints:

$$\left(\frac{\partial WZ_{calculated}}{\partial X_i}\right) = 0, \left(\frac{\partial^2 WZ_{calculated}}{\partial X_i \partial X_j}\right) = 0$$

and so on up to the desired order, with $X_i$ and $X_j$ being the flight parameters Mach, Cz, ... and the variables are $$\left(\frac{\partial \Delta\alpha}{\partial X_i}\right) \text{ and } \left(\frac{\partial^2 \Delta\alpha}{\partial X_i \partial X_j}\right),$$

and possibly others if the order of the polynomial is greater than 2.

In a variant, it is also possible to modify the values of the data tables of the model $Cz(\alpha, Mach, mass, CG, ...)$ directly by minimizing $$\sum_p WZ_p^2$$

for example. Modifying the Cz table is equivalent to interpolating in one or more $(\Delta\alpha_k(Cz, Mach, mass, CG, ...))_{1 \leq k \leq R}$ tables.

Specifically, when only one table is used, and as explained above, the N+R correction terms of $(\Delta\theta_{0_n})_{1 \leq n \leq N'}$ and $(\Delta\alpha_k(Cz, Mach, mass, CG ...))_{1 \leq k \leq R}$ where N characterizes the number of flights and R characterizes the number of flight conditions or flight points of the data table, are optimized for the purpose of having:

$\forall i \in [[1,N]], <WZ_{calculated}(\text{flight } i)> = 0$; and $\forall k \in [[1,M]], <WZ_{calculated}(\text{condition } k)> = 0$.

The N+R correction terms $(\Delta\theta_{0_n})_{1 \leq n \leq N}$ and $(\Delta\alpha_k(Cz, mass, CG, ...))_{1 \leq k \leq R}$ can be obtained by minimizing $$\sum_p WZ_p^2$$

over all of the measurements, the index p characterizing the various airplane measurements taken over all of the flights, while remaining limited to a determined flight envelope. In this method of interpolating in one or more tables of values, the airplane measurements are taken in the flight envelope defined by the bounds of the table. These airplane measurements can thus be taken under conditions that differ from one another, the important point being the number of airplane measurements compared with the number of variables in the calculation. Nevertheless, it should be ensured that the airplane has indeed passed through the entire flight envelope under consideration.

This variant amounts to transforming the two conditions that are the zero mean per flight and the zero mean per flight condition into a single condition: minimizing $$\sum_p WZ_p^2.$$

The vertical wind WZ calculated by the formula:

$$WZ_{calculated} = VZ_{geom} - TAS \cdot \sin(\theta_{measure} - \alpha_{model} + (\Delta\theta_0 - \Delta\alpha(Cz, Mach, mass, CG, \ldots)))$$

provides an estimate of the real wind to which the airplane is subjected. It is also possible to write:

$$\forall t, WZ_{real}(t) = WZ_{calculated}(t) + \varepsilon_{WZ}(t)$$

where the term $\varepsilon_{WZ}(t)$ is the error due to calculation. This error depends on measurement errors (such as errors concerning TAS, vertical acceleration $$\frac{dVz_{geom}}{dt},$$

vertical speed $VZ_{geom}$, or the mass of the airplane) and errors concerning $\Delta\theta_0$ and $\Delta\alpha(Cz, Mach, mass, CG, \ldots)$ (e.g. due to the limited discretization of the models and of the corrections, and thus to the interpolations). Under all circumstances, this error is not associated with the real value of the vertical wind $WZ_{real}(t)$.

The principles of statistics make it possible to write the following (where σ corresponds to the standard deviation and E[X] to the expected value for the variable "X"):

$$\sigma_{WZ_{calculated}}^2 = E[WZ_{calculated}^2] - E[WZ_{calculated}]^2$$

i.e.:

$$\sigma_{WZ_{calculated}}^2 = E[WZ_{real}^2 + \varepsilon_{WZ}^2 - 2 \cdot WZ_{real} \cdot \varepsilon_{WZ}] - E[WZ_{real} - \varepsilon_{WZ}]^2$$

Whence, by linearity of the expected value:

$$\sigma_{WZ_{calculated}}^2 = E[WZ_{real}^2] + E[\varepsilon_{WZ}^2] - 2 \cdot E[WZ_{real} \cdot \varepsilon_{WZ}] - (E[WZ_{real}] - E[\varepsilon_{WZ}])^2$$

As mentioned above, the error $\varepsilon_{WZ}$ is independent of $WZ_{real}$, and thus:

$$E[WZ_{real} \cdot \varepsilon_{WZ}] = E[WZ_{real}] \cdot E[\varepsilon_{WZ}].$$

This produces:

$$\sigma_{WZ_{calculate}}^2 = E[WZ_{real}^2] + E[\varepsilon_{WZ}^2] - E[WZ_{real}]^2 - E[\varepsilon_{WZ}]^2$$

i.e.:

$$\sigma_{WZ_{calculated}}^2 = \sigma_{WZ_{real}}^2 + \sigma_{\varepsilon 8\ WZ}^2$$

Minimizing the standard deviation of the error $\sigma_{\varepsilon 8\ WZ}$ thus amounts to minimizing the standard deviation of the vertical wind as calculated by the equation:

$$WZ_{calculated} = VZ_{geom} - TAS \cdot \sin(\theta_{measure} - \alpha_{model} + (\Delta\theta_0 - \Delta\alpha(Cz, Mach, mass, CG, \ldots)))$$

In order to provide the best estimate of the real vertical wind, it is thus possible to minimize:

$$\cdot \sum_p WZ_p^2,$$

each index "p" corresponding to an "airplane measurement" over a stage of flight, so each $WZ_p$ corresponds to the mean value of WZ(t) over the measurement stage under consideration. This method is pertinent if the measurement stages are all of approximately the same duration, and the airplane has approximately the same speed.

$$\cdot \frac{\sum_p \int_{t_p^{start}}^{t_p^{end}} (WZ(t))^2 \cdot dt}{\sum_p \int_{t_p^{start}}^{t_p^{end}} dt} \text{ or } \frac{\sum_p \int_{t_p^{start}}^{t_p^{end}} (WZ(t))^2 \cdot TAS(t) \cdot dt}{\sum_p \int_{t_p^{start}}^{t_p^{end}} TAS(t) \cdot dt} \text{ or }$$

$$\frac{\sum_p \int_{t_p^{start}}^{t_p^{end}} (WZ(t))^2 \cdot Vgeom(t) \cdot dt}{\sum_p \int_{t_p^{start}}^{t_p^{end}} Vgeom(t) \cdot dt}$$

that make it possible to avoid potential problems associated with different durations of measurement stages or flight stages and/or of different speeds of flight. The terms $t_p^{start}$ and $t_p^{end}$ correspond to the starting and ending times of each measurement stage or flight stage used in the application of the method.

In the method described, which, it should be recalled, relies on the following equation:

$$WZ_{calculated} = VZ_{geom} - TAS \cdot \sin(\theta_{measure} - \alpha_{model} + (\Delta\theta_0 - \Delta\alpha(Cz, \ldots))),$$

account is thus taken of a difference θ−α. As a result, a constant error $\varepsilon_\theta$ on the pitch angle is automatically compensated by an opposite error on the angle of attack $\varepsilon_\alpha = -\varepsilon_\theta$. It is thus necessary to call on an additional constraint in the process of calculating pitch angle correction terms $\Delta\theta_0$ (flights) and angle of attack correction terms $\Delta\alpha(Cz, Mach, mass, CG, \ldots)$. Apart from the method of minimizing $$\sum_p WZ_p^2,$$

and solely for the method of interpolating in one or more tables of values, one of the initial constraints (e.g. ⟨WZ(flight$_1$)⟩ =0 or ⟨WZ(Mach=0.8, Cz=0.5)⟩ =0) may be eliminated since it is redundant.

In the method by interpolation in one or more tables of values, and regardless of the method used for determining the variables, it is necessary to add at least as many constraints as there are tables of values: by way of example, it would be possible to set one of the $\Delta\theta_0$(flight$_i$) to 0, and/or one of the $\Delta\alpha$(Cz, Mach, mass, CG, . . . ) to 0, and/or possibly to set the mean $\Delta\alpha$(Cz, Mach, mass, CG, . . . ) to 0. If the correction term $\Delta\alpha$(Cz, Mach, mass, CG, . . . ) is provided only by a table of values, then only one additional constraint is sufficient. In contrast, if the correction term $\Delta\alpha$(Cz, Mach, mass, CG, . . . ) is the sum of a plurality of corrections that have variables in common, for example $\Delta\alpha$(Cz, Mach)+$\Delta\alpha$(Cz, CG), it is also necessary to take account of the additional degrees of freedom by replacing one of the constraints on $\Delta\alpha$ by other constraints: thus, if both correction tables use the same values of Cz, e.g. {0.4, 0.5, 0.6}, it is necessary to add as many constraints (e.g. in addition to $\Delta\alpha$(Cz=0.4, Mach=0.8)=0, setting three values of the table $\Delta\alpha$(Cz,CG), for each value of Cz: e.g., $\Delta\alpha$(Cz=0.4, CG=25%)=0, $\Delta\alpha$(Cz=0.5, CG=25%)=0, and $\Delta\alpha$(Cz=0.6, CG=25%)=0); with these four constraints, the undesirable degrees of freedom are eliminated.

For the method that uses linear or polynomial corrections, as specified above, it is necessary to set the value of $\Delta\alpha_0$: by way of example, it is possible to select $\Delta\alpha_0$ equal to zero.

There follows a detailed description of the calculations used in the correction methods of the invention. For this purpose, consideration is given to three simplified examples, while ignoring the possibilities of different calculations depending on the available volumes of measurements and flights. In particular, the correction calculations described herein relate to small numbers of flights and/or flight conditions (in order to simplify explanation, as mentioned initially).

In these examples, use is made of the corrections $\Delta\alpha$(Cz, Mach) obtained by interpolation in a table of values. Specifically, in the three situations given as examples below, interpolations are not necessary, since consideration is given to an ideal situation in which the flight conditions are exactly the same as those in the correction tables. These three situations are as follows: Situation 1: 1 flight and 1 flight condition; Situation 2: 1 flight and 2 flight conditions; and Situation 3: 2 flights and 2 flight conditions.

A "flight condition" is defined herein by a pair of values (Mach, Cz) (where Cz is the lift coefficient): for example, {Mach=0.8, Cz=0.5}. In real conditions, A "flight condition" could be defined by more than two "flight parameters" (e.g.: Cz, Mach, mass, position of the center of gravity).

Situation 1: 1 Flight and 1 Flight Condition:

In situation 1, which corresponds to FIG. 6, there is only one "flight point" that lasts throughout the flight. Under such conditions, it is possible to say that the "flight point" corresponds to the "flight condition" {Mach=0.8, Cz=0.5} that is maintained throughout the flight. This situation 1 amounts to having only one variable: $\Delta\theta_0$(flight$_1$).

In FIG. 6, the real vertical wind is plotted as a continuous line and the vertical wind as calculated using $WZ_{calculated}=VZ_{geom}-TAS \cdot \sin(\theta_{measure}-\alpha_{model})$ is plotted as a discontinuous line. At the top of FIG. 6, there can be seen a difference due to the error. In order to correct this difference, the pitch angle and angle of attack correction terms are calculated by using $\Delta\theta_0$(flight$_1$) and $\Delta\alpha$(Mach=0.8, Cz=0.5) and by applying the constraints $\langle WZ(flight_1)\rangle=0$ (zero mean vertical wind) and $\Delta\alpha$(Mach=0.8,Cz=0.5)=0, with one of the above-described methods of solving under constraint (as explained above, the constraint $\langle WZ(Mach=0.8,Cz=0.5)\rangle=0$ has been eliminated since it is redundant with the constraint $\langle WZ(flight_1)\rangle=0$). Once the correction terms have been obtained, it is possible to correct the calculated vertical wind by: $WZ_{calculated}=VZ_{geom}-TAS \cdot \sin(\theta_{measure}-\alpha_{model}+(\Delta\theta_0(flight_1)-\Delta\alpha(Cz, Mach)))$, which is shown in the diagram at the bottom of FIG. 6.

Situation 2: 1 Flight and 2 Flight Conditions:

In situation 2, which corresponds to FIG. 7, there are two successive "flight points", each occupying half of the flight. It is considered that these "flight points" correspond to the following "flight conditions":

Flight condition number 1: {Mach=0.8, Cz=0.5}.

Flight condition number 2: {Mach=0.8, Cz=0.6}.

FIG. 7 is similar to FIG. 6, except that this time it is necessary to calculate the correction terms $\Delta\theta_0$(flight$_1$), $\Delta\alpha_1$(Mach=0.8, Cz=0.5) and $\Delta\alpha_2$(Mach=0.8, Cz=0.6) and the constraints are as follows: $\langle WZ(flight_1)\rangle=0$, $\langle WZ(Mach=0.8, Cz=0.5)\rangle=0$, and $\Delta\alpha_1+\Delta\alpha_2=0$.

It can be seen that in this situation 2, the correction of the vertical wind depends on the "flight point" via the terms $\Delta\alpha_1$ and $\Delta\alpha_2$.

Situation 3: 2 Flights and 2 Flight Conditions:

In situation 3, which corresponds to FIG. 8, there are two "flight points" corresponding to the two "flight conditions" of the above example, each occupying half of the flight and repeated over two flights, corresponding to the flight of the preceding example, but performed twice.

FIG. 8 is similar to FIGS. 6 and 7, except this time it is necessary to calculate the correction terms $\Delta\theta_0$(flight$_1$), $\Delta\theta_0$(flight$_2$), $\Delta\alpha_1$(Mach=0.8, Cz=0.5) and $\Delta\alpha_2$(Mach=0.8, Cz=0.6) with the following constraints: $\langle WZ(flight_1)\rangle=0$, $\langle WZ(flight_2)\rangle=0$, $\langle WZ(Mach=0.8, Cz=0.5)\rangle=0$, and $\Delta\alpha_1+\Delta\alpha_2=0$.

In this situation, which is still greatly simplified compared with reality, it can be seen how the pitch angle and angle of attack corrections are interlinked, each depending on the other. This implies simultaneous solving of the system of equations corresponding to the constraints.

There follows a detailed description of the calculations used in the method of minimizing $$\sum_p WZ_p^2.$$

In this portion, there is no longer any question of observing the effect of the corrections on the way the vertical wind varies over time, and averaging systems are used to group together the data for a given stage of flight in order to obtain a single value per stage for each variable, and thus for example a mean vertical wind values $WZ_{calculated}$, a mean value for Cz, . . . . This use of per-stage means is shown diagrammatically in FIG. 9.

The correction continues to be of the "interpolation in a table of values" type, but this time only for "Cz" and linear interpolations are indeed performed since the flight conditions do not all correspond to the conditions of the $\Delta\alpha$(Cz) correction table. Furthermore, this time the method of minimizing $$\sum_p WZ_p^2$$

is applied. In this example and as shown in FIG. 10, it is necessary to calculate the correction terms $\Delta\theta_0$, $\Delta\alpha_1$(Cz=0.5), and $\Delta\alpha_2$(Cz=0.6) with the following constraints:

$$\min\left(\sum_{p=1}^{4} WZ_p^2\right)$$

and $\Delta\alpha_1(Cz=0.5)=0$.

In a particular implementation, it is possible to take account of the durations of the measurement and/or flight stages.

Specifically, since the measurement and/or flight stages may have different durations, it is possible to weight the mean values by their durations, or by the distances traveled, depending on the type of mean used. Thus, instead of using a formula of the type $$\langle X \rangle = \frac{1}{P} \sum_p \frac{\int_{t_p^{start}}^{t_p^{end}} X(t) \cdot dt}{\int_{t_p^{start}}^{t_p^{end}} dt} \quad (t_p^{start} \text{ and } t_p^{end}$$

corresponding to the start and end times of each measurement and/or flight stage, where p is the number of the stage and P designates the number of stages), it is possible to calculate the mean value by using the following formula:

$$\langle X \rangle = \frac{\sum_p \int_{t_p^{start}}^{t_p^{end}} X(t) \cdot dt}{\sum_p \int_{t_p^{start}}^{t_p^{end}} dt}.$$

This formula makes it possible to take account of stages having different durations, by weighting the mean value of the variable "X" over each stage by its duration.

However, since the vertical wind phenomenon is independent of the travel speed of the airplane, it may be preferable to use one of the following formulas:

$$\langle X \rangle = \frac{\sum_p \int_{t_p^{start}}^{t_p^{end}} X(t) TAS(t) \cdot dt}{\sum_p \int_{t_p^{start}}^{t_p^{end}} TAS(t) \cdot dt} \text{ or } \langle X \rangle = \frac{\sum_p \int_{t_p^{start}}^{t_p^{end}} X(t) Vgeom(t) \cdot dt}{\sum_p \int_{t_p^{start}}^{t_p^{end}} Vgeom(t) \cdot dt}$$

These formulations serve in particular to be unaffected by differing flight speeds among the stages. They amount to weighting the mean of the variable "X" over each stage, not by the duration of the stage, but by the distance traveled, either through the mass of air (by using the true airspeed TAS) or relative to the ground (by using the ground speed Vgeom)

These principles can also be applied to calculating linear or polynomial regressions. Thus, for constraints of the type $$\forall i \in [\![1, Q]\!], \left\langle \frac{\partial WZ_{calculated}}{\partial X_i} \right\rangle = 0,$$

instead of calculating the linear regression by taking for each measurement or flight stage the "conventional" mean value $$WZ_p = \frac{\int_{t_p^{start}}^{t_p^{end}} WZ_{calculated}(t) \cdot dt}{\int_{t_p^{start}}^{t_p^{end}} dt} = \frac{\int_{t_p^{start}}^{t_p^{end}} WZ_{calculated}(t) \cdot dt}{t_p^{end} - t_p^{start}}$$

and calculating the slope of the linear regression by a formula of the following type:

$$\left\langle \frac{\partial WZ_{calculated}}{\partial X_i} \right\rangle = \frac{\sum_p WZ_p \cdot (X_{i,p} - \langle X_i \rangle)}{\sum_p X_{i,p} \cdot (X_{i,p} - \langle X_i \rangle)}$$

with $$X_{i,p} = \frac{\int_{t_p^{start}}^{t_p^{end}} X_i(t) \cdot dt}{t_p^{end} - t_p^{start}} \text{ and } \langle X_i \rangle = \frac{1}{P} \sum_p X_{i,p}$$

it is preferred to use a formulation of the following type:

$$\left\langle \frac{\partial WZ_{calculated}}{\partial X_i} \right\rangle = \frac{\sum_p K_p \cdot WZ_p \cdot (X_{i,p} - \langle X_i \rangle)}{\sum_p K_p \cdot X_{i,p} \cdot (X_{i,p} - \langle X_i \rangle)}$$

with $$WZ_p = \frac{\int_{t_p^{start}}^{t_p^{end}} WZ_{calculated}(t) \cdot TAS(t) \cdot dt}{\int_{t_p^{start}}^{t_p^{end}} TAS(t) \cdot dt},$$

$$X_{i,p} = \frac{\int_{t_p^{start}}^{t_p^{end}} X_i(t) \cdot TAS(t) \cdot dt}{\int_{t_p^{start}}^{t_p^{end}} TAS(t) \cdot dt},$$

$$\langle X_i \rangle = \frac{\sum_p \int_{t_p^{start}}^{t_p^{end}} X_i(t) \cdot TAS(t) \cdot dt}{\sum_p \int_{t_p^{start}}^{t_p^{end}} TAS(t) \cdot dt}, \text{ and } K_p = \int_{t_p^{start}}^{t_p^{end}} TAS(t) \cdot dt$$

It should be understood that the numbers of measurements and values obtained using these measurements increases with increasing number of flights undertaken for the measurements, given that it is possible to use the measurements from a plurality of flights.

In a particular situation in which the gyro systems, e.g. laser systems used in inertial reference systems (IRS), conserve the same bias from one flight to another, it is possible to use a particular method of calculation in which the mean vertical wind constraint is as follows:

$$\begin{cases} \langle WZ(\text{flights } n1 \text{ to } n2)\rangle = 0 \\ \forall n \in [\![n1+1, n2]\!], \Delta\theta_{0_n} = \Delta\theta_{0_{n1}} \end{cases}$$

instead of $\forall n \in [\![n1, n2]\!]$, $\langle WZ(\text{flight} n)\rangle = 0$ in the general situation. For the method of minimizing $$\sum_p WZ_p^2$$

it suffices merely to replace the terms $\Delta\theta_{0_n} \forall n \in [\![n1+1, n2]\!]$ with $\Delta\theta_{0_{n1}}$. In the above formulas, bias is assumed to be constant for flights n1 to n2 with n1≥1, n2≤N, N being the total number of flights. Even on an airplane fitted with gyro systems in which bias is constant from one flight to another, any action between two flights that modifies the way they are secured to the structure would lead to a modification of the setting of the instrumentation between those two flights, and thus to it being impossible to assume that the bias is identical for those two flights. Furthermore, any significant modification to the loading of the fuselage of the airplane could lead to a modification of the deformation of the fuselage in flight, thereby modifying the pitch angle difference between the location where it is measured by the gyros, and the section of the fuselage to which the wings are attached. On such airplanes, it might thus be possible to envisage considering the pitch angle bias as being constant over series of flights, with these series of flights being separated by actions taken on the instrumentation or on the loading of the airplane that might affect the pitch angle bias.

With the various above methods it is thus possible to calculate the corrections to be made to the pitch angle and to the angle of attack, and thus to calculate the vertical wind or even the calculated measurements or values or other characteristics of the airplane, while relying on the same principles. Thus, it becomes possible in particular to rely on the vertical wind calculated at each instant using the formula:

$$WZ_{calculated} = VZ_{geom} - \text{TAS} \cdot \sin(\theta_{measure} - \alpha_{model} + (\Delta\sigma_0 - \Delta\alpha(Cz, \text{Mach}, \text{mass}, CG, \ldots)))$$

There follows a description of an application to calculating an airplane characteristic, namely its drag coefficient Cx.

The method of resetting a "Cx" drag model consists in comparing Cx values obtained by measurements during tests in flight with Cx values that are predicted or obtained by applying the drag model of the airplane, and then in correcting the predicted values in order to minimize the differences.

Applying the fundamental principles of dynamics in the terrestrial reference frame to the aircraft and as projecting along the vector $\underline{e}_{x_h}^{aero}$ gives:

with $\gamma_{aero} = (\theta_{measure} + \Delta\theta_0) - (\alpha_{model} + \Delta\alpha(Cz, \text{Mach}, \text{mass}, CG, \ldots))$.

It may be observed that the term $Cz \cdot \tan(\gamma_{aero})$ involves the calculated vertical wind.

This formula is given by way of example and it should be understood that it is possible to calculate the drag coefficient Cx using other formulas based on applying the fundamental principles of dynamics, in particular in a reference frame that is slightly different.

The approach below is based on the fact that the difference $\Delta Cx = Cx_{measure} - Cx_{model}$ obtained for each measurement stems in part from the inaccuracy of the measurements, and in part from the error of the model.

If it is assumed that the measurements contain noise but are not biased, for every flight point defined by a set of flight parameters [Cz, Mach, mass, CG, Re, altitude, ...] having particular values and for which sufficient measurements have been taken, then:

$$\langle \Delta Cx(Cz, \text{Mach}, \text{mass}, CG, Re, \text{altitude}, \ldots)\rangle = 0$$

using the same type of approach and logic as for adjusting $\Delta\theta_0$ and $\Delta\alpha$, it is possible to reset the drag model by correcting $Cx_{model}(Cz, \text{Mach}, \text{mass}, CG, Re, \text{altitude}, \ldots)$ in order to satisfy the above equation.

This ends up with obtaining a complete aerodynamic database (lift and drag coefficients) that is reset on the results of testing in flight.

There follows a description of FIGS. 3 and 4 in order to show clearly the contribution of the invention making it possible to obtain a corrected drag coefficient Cx compared with conventional calculation methods in which the drag coefficient Cx is calculated from measurements and values without making corrections for pitch angle and angle of attack.

As shown in the left-hand portions of FIGS. 3 and 4, these measurements and values correspond to measurements of acceleration, of angles, and of speeds, and to the values of the thrust components of the engine(s) $F_G$ and RD calculated on the basis of an engine thrust model and from flight conditions (mass, Mach, pressure, engine speed, etc.) that are, in part, measured.

In the conventional method, shown in FIG. 3, the drag coefficient coming from measurements and values $Cx_{gross}$ is calculated directly as a function of the propulsion equation of the airplane without taking account of vertical wind. It is naturally possible to take account of vertical wind by using the pitch angle and angle of attack measurements, but it is very difficult to achieve sufficient accuracy for those measurements, which makes calculating vertical wind by that method very inaccurate.

It is possible to use the following propulsion equation, expressed in the aerodynamic reference frame, assuming that the airplane is flying in a straight line, and neglecting the Coriolis effect:

$$Cx_{measure} = \frac{-m \cdot \left(\frac{dV_{geom}}{dt} + a_{Coriolis}\right) \cdot \underline{e}_{x_h}^{aero} + F_G \cdot \cos(\theta_{measure} + \Delta\theta_0 + \text{setting}) - RD \cdot \cos(\gamma_{aero})}{q \cdot S \cdot \cos(\gamma_{aero})} - Cz \cdot \tan(\gamma_{aero})$$

$$Cx_{gross} = \frac{-m \cdot \frac{dV_{geom}}{dt} \cdot e_x^{aero} + F_G \cdot \cos(\alpha_{measure} + \text{setting}) - RD - m \cdot g \cdot \sin(\gamma_{aero})}{q \cdot S}$$

With $$\sin(\gamma_{aero}) = \frac{Vz_{geom}}{TAS}$$

if the vertical wind is ignored, and $\gamma_{aero} = \theta_{measure} - \alpha_{measure}$ if an estimate is used of the aerodynamic slope (which includes the vertical wind) on the basis of the pitch angle and angle of attack measurements.

The drag coefficient $Cx_{model}$ coming from application of the drag model of the airplane is obtained from the lift coefficient Cz, which itself comes from an application of a lift equation with the measurements and the values.

In the method proposed by the invention, a method is implemented for correcting both the angle of attack as modelled (calculated by applying an angle of attack model) and also the pitch angle as measured in order to calculate the drag coefficient from the measurements and values, which method is based on constraints of vertical wind that is zero on average. With the corrected angles of attack and pitch angles, the method makes it possible to calculate the corrected drag coefficient from the measurements and values, as shown in FIG. 4, with the contribution of the invention to correcting the angle of attack and the pitch angle corresponding to the box shown in the right-hand portion of FIG. 4.

This contribution can be summarized by FIG. 5 and it can be seen that the method of resetting the Cz model is prior to and independent of the method of resetting Cx, and may be used on its own for the sole purpose of obtaining an accurate model associating angle of attack with lift. It can also be seen that once the corrections $\Delta\theta_0$ n and $\Delta\alpha$(Cz, Mach, CG, . . . ) have been calculated, they are frozen to enable $WZ_{calculated}$ to be calculated and thus to enable the aerodynamic slope $\gamma_{aero}$ to be calculated at each instant in flight, which term is subsequently re-used when calculating $Cx_{measure}$ in order to correct it.

The invention claimed is:

1. A method calculating a drag coefficient $Cx_{measure}$ of an airplane, said method comprising a first process and a second process,
   the first process comprising a correction of a lift model of the airplane to provide a corrected lift model, and
   the second process comprising use of a measured pitch angle and of the corrected lift model to calculate the drag coefficient $Cx_{pressure}$ by taking into account a calculated vertical wind,
   said first and second processes being based on measurements, including at least geometrical speed, airspeed and pitch angle, taken in flight by measurement apparatuses and on values calculated from said measurements taken in flight and during at least one flight, the measurement apparatuses producing measurements that might suffer bias, the measurements in flight being taken under at least one determined flight condition defining a determined flight point, each flight condition being defined by particular flight parameters values, each flight point corresponding to a determined combination of flight parameters values and thus to a determined flight condition, one of the flight parameters being a lift coefficient Cz, said measurements and values comprising firstly, $\theta_{measure}$, the measured pitch angle of the airplane, and secondly, $\alpha_{model}$, a calculated angle of attack of the airplane, the measured pitch angle $\theta_{measure}$ being corrected by a pitch angle correction term $\Delta\theta_0$ and the angle of attack $\alpha_{model}$ being corrected by an angle of attack correction term $\Delta\alpha$(Cz, . . . );
   wherein the angle of attack $\alpha_{model}$ of the airplane is calculated by solving a lift equation and utilizing a lift model associating the angle of attack $\alpha$ of the airplane with at least one flight parameter which is the lift coefficient Cz of the airplane, and
   wherein the pitch angle correction term $\Delta\theta_0$ and the attack correction term $\Delta\alpha$(Cz, . . . ) are calculated utilizing a first assumption and a second assumption, the first assumption stating that an average vertical wind is practically zero during one or more flights, and the second assumption stating an independence between the vertical wind and the flight parameters $X_i$, the first and second assumptions being implemented according to the following calculation operations:
   the pitch angle correction term $\Delta\theta_0$ is calculated with the assumption that the mean vertical wind WZ is zero for all of the determined flight points that belong to one or plural flights having the same measurement bias;
   the angle of attack correction term $\Delta\alpha$(Cz, . . . ) is calculated with the assumption that the mean vertical wind WZ for each determined flight condition is zero;
   the vertical wind WZ to which the airplane is subjected is calculated by:

$$WZ_{calculated} = VZ_{geom} - TAS \cdot \sin(\theta_{measure} - \alpha_{model} + (\Delta\theta_0 - \Delta\alpha(Cz, \ldots)))$$

where $VZ_{geom}$ is the vertical speed of the airplane in the terrestrial reference frame, which is positive going upwards, and TAS is the true air speed of the airplane in the aerodynamic reference frame,
   the drag coefficient $Cx_{measure}$ of the airplane being calculated by means of a calculation formula taking account of the calculated vertical wind, said calculation formula including an aerodynamic slope term $\gamma_{aero}$ with $$\gamma_{aero} = (\theta_{measure} + \Delta\theta_0) - (\alpha_{model} + \Delta\alpha(Cz, \ldots)).$$

2. The method according to claim 1, wherein the angle of attack correction term $\Delta\alpha$(Cz, . . . ) and the pitch angle correction term $\Delta\theta_0$ are calculated under their respective constraints of zero mean vertical wind speed by solving a system of equations including degrees of freedom, and wherein when the number of degrees of freedom in the system is strictly positive, any redundant constraints are eliminated, and then additional constraints relating to the terms for correcting the angle of attack $\Delta\alpha$(Cz, . . . ) and/or the pitch angle $\Delta\theta_0$ are added to said constraints of the system concerning the vertical wind, the number of additional constraints making it possible to have as many independent equations as there are variables in order to reduce to zero the number of degrees of freedom in the system with the additional constraint(s).

3. The method according to claim 2, wherein the angle of attack of the airplane $\alpha_{model}$ is calculated by solving a lift equation and an aerodynamic model associating the angle of attack $\alpha$ of the airplane with the lift coefficient Cz of the airplane, and also with one or more of the following flight parameters: a Mach number of the airplane, a total mass m of the airplane, a position of the center of gravity CG of the airplane.

4. The method according to claim 2, wherein when only one single flight is undertaken and when the number of airplane measurements is less than a first threshold, an angle of attack correction term $\Delta\alpha(Cz, \ldots)$ of value zero is used by default: $\Delta\alpha(Cz, \ldots) = 0$.

5. The method according to claim 2, wherein when at least one flight is undertaken and when the number of measurements is greater than a second threshold, the angle of attack correction term $\Delta\alpha(Cz, Mach, mass, CG, \ldots)$ is calculated by overall linear regression on all of the flights and by resolving by flight parameter Cz, Mach, mass, CG, ... with:

$$\Delta\alpha(X_1, X_2, \ldots) = \Delta\alpha_0 + \sum_i (X_i - X_i^{ref}) \cdot \left(\frac{\partial \Delta\alpha}{\partial X_i}\right)$$

where $\Delta\alpha_0$ is set by the user, and where $X_i$ corresponds to each flight parameter, Cz, Mach, mass, CG, ... ;
the constraint then being that $$\left(\frac{\partial WZ}{\partial X_i}\right)$$

is zero, where $$\left(\frac{\partial WZ}{\partial X_i}\right)$$

is a slope of a linear regression of WZ for each flight parameter $X_i$ over all of the measurements.

6. The method according to claim 2, wherein when at least one flight is undertaken and when the number of measurements is greater than a third threshold, the angle of attack correction term $\Delta\alpha(Cz, Mach, mass, CG, \ldots)$ is calculated by overall multi-variable polynomial regression on all of the flights and by resolving by flight parameter Cz, Mach, mass, CG, ... with:

$$\Delta\alpha(X_1, X_2, \ldots) = \Delta\alpha_0 + \sum_i (X_i - X_i^{ref}) \cdot \left(\frac{\partial \Delta\alpha}{\partial X_i}\right) + \sum_i \sum_j (X_i - X_i^{ref}) \cdot (X_j - X_j^{ref}) \cdot \left(\frac{\partial^2 \Delta\alpha}{\partial X_i \partial X_j}\right) + \ldots$$

where each instance of the indices i and j corresponds to each flight parameter Cz, Mach, mass, CG, ... , and where $\Delta\alpha_0$ is set by the user.

7. The method according to claim 2, wherein the pitch angle correction and angle of attack correction terms $\Delta\theta_0$ and $\Delta\alpha(Cz,$ are calculated under the constraint of minimizing $$\sum_p WZ_p^2,$$

where the index p characterizes the various airplane measurements taken over all of the flights while being limited to a determined flight envelope.

8. The method according to claim 1, wherein the angle of attack of the airplane $\alpha_{model}$ is calculated by solving a lift equation and an aerodynamic model associating the angle of attack $\alpha$ of the airplane with the lift coefficient Cz of the airplane, and also with one or more of the following flight parameters: a Mach number of the airplane, a total mass m of the airplane, a position of the center of gravity CG of the airplane.

9. The method according to claim 8, wherein when only one single flight is undertaken and when the number of airplane measurements is less than a first threshold, an angle of attack correction term $\Delta\alpha(Cz,$ of value zero is used by default: $\Delta\alpha(Cz, = 0$.

10. The method according to claim 8, wherein when at least one flight is undertaken and when the number of measurements is greater than a second threshold, the angle of attack correction term $\Delta\alpha(Cz, Mach, mass, CG, \ldots)$ is calculated by overall linear regression on all of the flights and by resolving by flight parameter Cz, Mach, mass, CG, ... with:

$$\Delta\alpha(X_1, X_2, \ldots) = \Delta\alpha_0 + \sum_i (X_i - X_i^{ref}) \cdot \left(\frac{\partial \Delta\alpha}{\partial X_i}\right)$$

where $\Delta\alpha_0$ is set by the user, and where $X_i$ corresponds to each flight parameter, Cz, Mach, mass, CG, ... ;
the constraint then being that $$\left(\frac{\partial WZ}{\partial X_i}\right)$$

is zero, where $$\frac{\partial WZ}{\partial X_i}$$

is a slope of a linear regression of WZ for each flight parameter $X_i$ over all of the measurements.

11. The method according to claim 8, wherein when at least one flight is undertaken and when the number of measurements is greater than a third threshold, the angle of attack correction term $\Delta\alpha(Cz, Mach, mass, CG, \ldots)$ is calculated by overall multi-variable polynomial regression on all of the flights and by resolving by flight parameter Cz, Mach, mass, CG, ... with:

$$\Delta\alpha(X_1, X_2, \ldots) = \Delta\alpha_0 + \sum_i (X_i - X_i^{ref}) \cdot \left(\frac{\partial \Delta\alpha}{\partial X_i}\right) + \sum_i \sum_j (X_i - X_i^{ref}) \cdot (X_j - X_j^{ref}) \cdot \left(\frac{\partial^2 \Delta\alpha}{\partial X_i \partial X_j}\right) + \ldots$$

where each instance of the indices i and j corresponds to each flight parameter Cz, Mach, mass, CG, ... , and where $\Delta\alpha_0$ is set by the user.

12. The method according to claim 8, wherein the pitch angle correction term $\Delta\theta_0$ and the angle of attack correction term $\Delta\alpha(Cz, \ldots)$ are calculated under a constraint of minimizing $$\sum_p WZ_p^2,$$

where the index p characterizes the various airplane measurements taken over all of the flights while being limited to a determined flight envelope.

13. The method according to claim 1, wherein when only one single flight is undertaken and when the number of airplane measurements is less than a first threshold, an angle of attack correction term $\Delta\alpha(Cz, \ldots)$ of value zero is used by default: $\Delta\alpha(Cz, \ldots)=0$.

14. The method according to claim 1, wherein when at least one flight is undertaken and when the number of measurements is greater than a second threshold, the angle of attack correction term $\Delta\alpha(Cz, \text{Mach}, \text{mass}, CG, \ldots)$ is calculated by overall linear regression on all of the flights and by resolving by flight parameter Cz, Mach, mass, CG, ... with:

$$\Delta\alpha(X_1, X_2, \ldots) = \Delta\alpha_0 + \sum_i (X_i - X_i^{ref}) \cdot \left(\frac{\partial \Delta\alpha}{\partial X_i}\right)$$

where $\Delta\alpha_0$ is set by the user, and where $X_i$ corresponds to each flight parameter, Cz, Mach, mass, CG, ...;
the constraint then being that $$\left\langle\frac{\partial WZ}{\partial X_i}\right\rangle$$

is zero, where $$\left\langle\frac{\partial WZ}{\partial X_i}\right\rangle$$

is a slope of a linear regression of WZ for each flight parameter $X_i$ over all of the measurements.

15. The method according to claim 1, wherein when at least one flight is undertaken and when the number of measurements is greater than a third threshold, the angle of attack correction term $\Delta\alpha(Cz, \text{Mach}, \text{mass}, CG, \ldots)$ is calculated by overall multi-variable polynomial regression on all of the flights and by resolving by flight parameter Cz, Mach, mass, CG, ... with:

$$\Delta\alpha(X_1, X_2, \ldots) = \Delta\alpha_0 + \sum_i (X_i - X_i^{ref}) \cdot \left(\frac{\partial \Delta\alpha}{\partial X_i}\right) + \sum_i \sum_j (X_i - X_i^{ref}) \cdot (X_j - X_j^{ref}) \cdot \left(\frac{\partial^2 \Delta\alpha}{\partial X_i \partial X_j}\right) + \ldots$$

where each instance of the indices i and j corresponds to each flight parameter Cz, Mach, mass, CG, ..., and where $\Delta\alpha_0$ is set by the user.

16. The method according to claim 1, wherein the pitch angle correction and angle of attack correction terms $\Delta\theta_0$ and $\Delta\alpha(Cz, \ldots)$ are calculated under the constraint of minimizing $$\sum_p WZ_p^2,$$

where the index p characterizes the various airplane measurements taken over all of the flights while being limited to a determined flight envelope.

17. The method according to claim 1, wherein the airplane measurements are taken in a simplifying flight configuration corresponding to an airplane in level flight with a zero roll angle and with a stable engine speed.

18. The method according to claim 1, wherein initially the lift coefficient Cz is calculated on the basis of an engine thrust model and possibly of an aerodynamic drag model of the airplane, and subsequently the pitch angle and angle of attack correction terms $\Delta\theta_0$ and $\Delta\alpha(Cz, \ldots)$ are calculated, after which the lift model Cz=f (angle of attack, ...) is corrected by using at least the angle of attack correction term $\Delta\alpha(Cz, \ldots)$.

19. The method according to claim 1, wherein the drag coefficient $Cx_{measure}$ is calculated by:

$$Cx_{measure} = \frac{-m \cdot \left(\frac{dV_{geom}}{dt} + \underline{a_{Coriolis}}\right) \cdot \underline{e_{x_h}^{aero}} + F_G \cdot \cos(\theta_{measure} + \Delta\theta_0 + \text{setting}) - RD \cdot \cos(\gamma_{aero})}{q \cdot S \cdot \cos(\gamma_{aero})} - Cz \cdot \tan(\gamma_{aero})$$

where:
$\gamma_{aero}$ is the aerodynamic slope;
$V_{geom}$ is the speed vector in the terrestrial reference frame;
$e_x^{aero}$ is the normalized vector collinear with the true airspeed vector;
$e_{x_h}^{aero}$ is the normalized vector resulting from projecting the vector $e_x^{aero}$ the horizontal plane;
m is the mass of the airplane;
$F_G$ is the gross thrust of the engines;
RD is the ram drag of the engines;
setting is the vertical setting angle of the engines relative to the axis of the airplane;
q is the reference dynamic pressure;
S is the reference surface area of the airplane; and
$a_{Coriolis}$ is Coriolis acceleration.

\* \* \* \* \*